United States Patent
Duchateau et al.

(10) Patent No.: US 10,465,018 B2
(45) Date of Patent: *Nov. 5, 2019

(54) PROCESS FOR THE PREPARATION OF A POLYOLEFIN HAVING ONE OR MULTIPLE END-FUNCTIONALIZED BRANCHES

(71) Applicant: SABIC GLOBAL TECHNOLOGIES B.V., Bergen op Zoom (NL)

(72) Inventors: Robbert R. Duchateau, Eindhoven (NL); Miloud Bouyahyi, Eindhoven (NL); Lidia Jasinska-Walc, Eindhoven (NL); Martin Alexander Zuideveld, Kelmis (BE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 22 days.

This patent is subject to a terminal disclaimer.

(21) Appl. No.: 15/537,933

(22) PCT Filed: Dec. 23, 2015

(86) PCT No.: PCT/EP2015/081207
§ 371 (c)(1),
(2) Date: Jun. 20, 2017

(87) PCT Pub. No.: WO2016/102694
PCT Pub. Date: Jun. 30, 2016

(65) Prior Publication Data
US 2017/0355787 A1    Dec. 14, 2017

(30) Foreign Application Priority Data
Dec. 23, 2014   (EP) .................................... 14200124

(51) Int. Cl.
*C08F 2/38* (2006.01)
*C08F 210/16* (2006.01)
(Continued)

(52) U.S. Cl.
CPC ............ *C08F 2/38* (2013.01); *B01J 31/2295* (2013.01); *C08F 4/65927* (2013.01); *C08F 8/00* (2013.01);
(Continued)

(58) Field of Classification Search
CPC .... C08F 210/16; C08F 210/00; C08F 110/00; C08F 2/38
See application file for complete search history.

(56) References Cited

U.S. PATENT DOCUMENTS 4,414,132 A    11/1983  Goodall et al.
4,717,755 A *   1/1988  Doi .......................... C08F 8/00
                                                       525/333.7
(Continued)

FOREIGN PATENT DOCUMENTS

EP    1092730 A1    4/2001
EP    1283222 A1    2/2003
(Continued)

OTHER PUBLICATIONS

Shiono, Y.; Sugimoto, M.; Hasan, T.; Cai, Z. Macromol. Chem. Phys. 2013, 214, 2239-2244. (Year: 2013).*
(Continued)

*Primary Examiner* — Rip A Lee
(74) *Attorney, Agent, or Firm* — Cantor Colburn LLP

(57) ABSTRACT

The present invention relates to a process for the preparation of branched polyolefins having end-functionalized branches via the copolymerization of an olefin monomer and an olefin comprising main group metal hydrocarbyl chain transfer agent. The invention moreover relates to branched polyolefin having end-functionalized branches obtained by said process.

19 Claims, 1 Drawing Sheet

| Formula | Structure |
|---|---|
| I-A | X=Y |
| I-B | X≡Y |
| I-C | Y=X=Z¹ |
| I-D | Y—X=Z¹ |
| I-E | (triangle: Z¹ above, X—Y below) |
| I-F | Z¹—X(=Y)—Z² |
| I-G | Z¹=X(—Y)—Z² |

(51) Int. Cl.
  *C08F 8/00* (2006.01)
  *B01J 31/22* (2006.01)
  *C08F 4/6592* (2006.01)
  *C08F 293/00* (2006.01)

(52) U.S. Cl.
  CPC .......... *C08F 210/16* (2013.01); *C08F 293/00* (2013.01); *C08F 2500/09* (2013.01)

(56) References Cited

U.S. PATENT DOCUMENTS

| | | | |
|---|---|---|---|
| 4,978,648 A | 12/1990 | Barbé et al. | |
| 5,077,357 A | 12/1991 | Job | |
| 5,106,806 A | 4/1992 | Job | |
| 5,472,785 A * | 12/1995 | Stobbie, IV | C08G 18/10 428/423.1 |
| 5,556,820 A | 9/1996 | Funabashi et al. | |
| 5,569,730 A | 10/1996 | Goodall et al. | |
| 5,939,495 A * | 8/1999 | Kioka | C08F 8/00 525/333.7 |
| 6,028,151 A * | 2/2000 | Wasserman | C08F 10/00 526/129 |
| 6,248,837 B1 | 6/2001 | Chung et al. | |
| 6,258,902 B1 | 7/2001 | Campbell, Jr. et al. | |
| 7,858,707 B2 * | 12/2010 | Arriola | C08F 10/00 525/245 |
| 2001/0041779 A1 | 11/2001 | Shin et al. | |
| 2008/0311812 A1 | 12/2008 | Arriola et al. | |
| 2009/0048399 A1 | 2/2009 | Reijntjens et al. | |
| 2014/0039138 A1 | 2/2014 | Giesbrecht et al. | |
| 2014/0039139 A1 | 2/2014 | Giesbrecht et al. | |
| 2014/0039140 A1 | 2/2014 | Giesbrecht et al. | |
| 2014/0350200 A1 | 11/2014 | Batinas-Geurts et al. | |

FOREIGN PATENT DOCUMENTS

| | | |
|---|---|---|
| EP | 1605000 A1 | 12/2005 |
| WO | 9319104 A1 | 9/1993 |
| WO | 9613529 A1 | 5/1996 |
| WO | 9632427 A1 | 10/1996 |
| WO | 9742232 A1 | 11/1997 |
| WO | 9742236 A1 | 11/1997 |
| WO | 0043426 A1 | 7/2000 |
| WO | 0123441 A1 | 4/2001 |
| WO | 03014046 A1 | 2/2003 |
| WO | 2004081064 A1 | 9/2004 |
| WO | 2007134851 A1 | 11/2007 |
| WO | 2011014533 A1 | 2/2011 |

OTHER PUBLICATIONS

UNICID 700 Acid Datasheet. (Year: 2018).*
Makio, H.; Fukita, T. Macromol. Rapid Commun. 2007, 28, 698-703. (Year: 2007).*
Nam, Y.-G.; Shiono, T.; Ikeda, T. Macromolecules 2002, 35, 6760-6762. (Year: 2002).*
German, I.; Kelhifi, W.; Norsic, S.; Boisson, C.; D'Agosto, F. Angew. Chem. Int. Ed. 2013, 52, 3438-3441. (Year: 2013).*
Barta, Nancy S., et al., "Competitive intramolecular Ti—C versus Al-C alkene insertions: examining the role of Lewis acid cocatalysts in Ziegler-Natta alkene insertion and chain transfer reactions", Journal of Organometallic Chemistry 487 (1995) 47-53.
Boffa, Lisa S. and Novak, Bruce M., "Copolymerization of Polar Monomers with Olefins Using Transition-Metal Complexes", Chem. Rev. 2000, 100, 1479-1493.
Chen, Zhou, et al., "Copolymerization of Ethylene with Functionalized Olefins by [ONX] Titanium Complexes". Macromolecules 2013, 46, 2870-2875.
Chung, T.C. and Janvikul, W., "Borane-containing polyolefins: synthesis and applications", Journal of Organometallic Chemistry 581 (1999) 176-187.
Chung, T.C. and Rhubright, D., "Synthesis of Functionalized Polypropylene", Macromolecules 1991, 24, 970-972.
Chung, T.C., et al, "A novel synthesis of PP-b-PMMA copolymers via metallocene catalysis and borane chemistry" Polymer vol. 38 No. 6, pp. 1495 1502. 1997.
Chung, T.C., et al, "Synthesis of Ethylene-Propylene Rubber Graft Copolymers by Borane Approach", Macromolecules 1994, 27, 26-31.
German, Ian, et al., "Telechelic Polyethylene from Catalyzed Chain-Growth Polymerization", Angew. Chem. Int. Ed. 2013, 52, 3438-3441.
Hustad. Phillip D., et al., "Continuous Production of Ethylene-Based Diblock Copolymers Using Coordinative Chain Transfer Polymerization" Macromolecules, vol. 40, No. 20, 2007, 7061-7064.
Kempe, Rhett, "How to Polymerize Ethylene in a Highly Controlled Fashion?" Chem. Eur. J. 2007, 13, 2764-2773.
Langston, Justin A., et al., "Synthesis and Characterization of Long Chain Branched Isotactic Polypropylene via Metallocene Catalyst and T-Reagent", Macromolecules 2007, 40, 2712-2720.
Makio, Haruyuki and Fujita, Terunori, "Synthesis of Chain-End Functionalized Polyolefins with a Bis(phenoxy imine) Titanium Catalyst" Macromol. Rapid Commun. 2007, 28, 698-703.
Naga, Naofumi and Mizunuma, Kooji, V, "Chain transfer reaction by trialkylaluminum (AlR3) in the stereospecific polymerization of propylene with metallocene—AlR 3/Ph3CB(C6F5)4", Polymer vol. 39 No. 21, pp. 5059-5067, 1998.
Ring, Jochen O., et al., "Controlled Synthesis and Characterization of Poly[ethylene-block-(L,L-lactide)]s by Combining Catalytic Ethylene Oligomerization with "Coordination-Insertion" Ring-Opening Polymerization", Macromol. Chem. Phys. 2007, 208, 896-902.
Saito, Junji, et al., "Selective Synthesis of Al-Terminated Polyethylenes Using a Bis(Phenoxy-Imine)Zr Complex with Methylalumoxane", Macromolecules 2005, 38, 4955-4957.
Shiono, Takeshi, et al, "Facile Synthesis of Hydroxy-Functionalized Cycloolefin Copolymer Using ω-Alkenylaluminium as a Comonomer", Macromol. Chem. Phys. 2013, 214, 2239-2244.
International Search Report; International Application No. PCT/EP2015/081203; International Filing Date: Dec. 23, 2015; dated Apr. 22, 2016; 5 pages.
Naga, N. et al., "Liquid Crystalline Features in a Polyolefin of Poly(methylene-1,3-cyclopentane)," Macromolecules; 2008, pp. 7448-7452, vol. 41, No. 20.
Saito, J. et al. "Polymerization of Higher R-Olefins with a Bis(Phenoxyimine)Ti Complex/i-Bu3Al/Ph3CB(C6F5)4: Formation of Stereo-Regioirregular High Molecular Weight Polymers with High Efficiency," Macromolecules; 2006, pp. 4023-4031, vol. 39, No. 12.
Written Opinon; International Application No. PCT/EP2015/081203; International Filing Date: Dec. 23, 2015; dated Apr. 22, 2016; 6 pages.
Amin, Smruti B., et al., "Alkenylsilane Effects on Organotitanium-Catalyzed Ethylene Polymerization. Toward Simultaneous Polyolefin Branch and Functional Group Introduction," Journal of the American Chemical Society; 2006, pp. 4506-4507, vol. 128, No. 14.
Amin, Smruti B., et al., "Alkenylsilane Effects on Organotitanium-Catalyzed Ethylene Polymerization. Toward Simultaneous Polyolefin Branch and Functional Group Introduction," J. American Chemical Society; 2007, pp. 2938-2953, vol. 129, No. 10.
Arriola, D. et al., "Catalytic Production of Olefin Block Copolymers via Chain Shuttling Polymerization," Science; May 5, 2006, pp. 714-719, vol. 312.
Britovsek et al., "Iron Catalyzed Polyethylene Chain Growth on Zinc: A Study of the Factors Delineating Chain Transfer versus Catalyzed Chain Growth in Zinc and Related Metal Alkyl Systems," J. Am. Chem. Soc.; 2004, vol. 126, pp. 10701-10712.
Britovsek, George, et al, "Iron-Catalyzed Polyethylene Chain Growth on Zinc: Linear a-Olefins with a Poisson Distribution", Angew. Chem. Int. Ed. 2002, 41, No. 3, pp. 489-491.

(56) References Cited

OTHER PUBLICATIONS

Chen et al., "Cocatalysts for Metal-Catalyzed Olefin Polymerization: Activators, Activation Processes, and Structure-Activity Relationships," Chemical Reviews; 2000, pp. 1391-1434, vol. 100, No. 4.
Choi, K. et al., "Recent Developments in Transition Metal Catalyzed Olefin Polymerization—A Survey. I. Ethylene Polymerization," Journal of Macromolecular Science; 1985, pp. 1-55, Part C, 25:1.
Chung, T.C. and G. Xu, "Metallocene-Mediated Olefin Polymerization with B—H Chain Transfer Agents: Synthesis of Chain-End Functionalized Polyolefins and Diblock Copolymers," Macromolecules; 2001, pp. 8040-8050, vol. 34.
Fan, Guoquiang and Jin-Yong Dong, "An examination of aluminum chain transfer reaction in rac-Me2Si[2-Me-4-Naph-Ind]2ZrCl2/MAO-catalyzed propylene polymerization and synthesis of aluminum-terminated isotactic polypropylene with controlled molecular weight," Journal of Molecular Catalysis A: Chemical 236 (2005) 246-252.
International Search Report; International Application No. PCT/EP2015/081207; International Filing Date: Dec. 23, 2015; dated Apr. 22, 2016; 8 pages.
Kretschmer, W. et al, "Reversible Chain Transfer between Organoyttrium Cations and Aluminum: Synthesis of Aluminum-Terminated Polyethylene with Extremely Narrow Molecular-Weight Distribution," Chemistry European Journal; 2006, pp. 8969-8977, vol. 12.
Kuhlman, R. et al., "Investigations of Chain Shuttling Olefin Polymerization UsingDeuterium Labeling," Macromolecules; 2008, pp. 4090-4094, vol. 41, No. 12.
Lieber, S. et al., "Propene Polymerization with Catalyst Mixtures Containing Different ansa-Zirconocenes: Chain Transfer to Alkylaluminum Cocatalysts and Formation of Stereoblock Polymers," Macromolecules; 2000, pp. 9192-9199, vol. 33, No. 5.
Lin, W. et al., "Borane Chain Transfer Reaction in Olefin Polymerization Using Trialkylboranes as Chain Transfer Agents," Journal of Polymer Science: Part A: Polymer Chemistry; 2010, pp. 3534-3541, vol. 48.
Lu, Y. et al., "Synthesis of New Amphiphilic Diblock Copolymers Containing Poly(ethylene oxide) and Poly(a-olefin)," Journal of Polymer Science: Part A: Polymer Chemistry; 2002, pp. 3416-3425, vol. 40.

Makio et al., "Synthesis of Telechelic Olefin Polymers via Catalyzed Chain Growth on Multinuclear Alkylene Zinc Compounds," J. Am. Chem. Soc; 2013, pp. 8177-8180, vol. 135.
Obenauf, J. et al., "Efficient Synthesis of Aluminium-Terminated Polyethylene by Means of Irreversible Coordinative Chain-Transfer," European Journal of Inorganic Chemistry; 2014, pp. 1446-1453, vol. 9.
Pullukat et al., "Silica-Based Ziegler-Natta Catalysts: A Patent Review," Catalysis Reviews: Science and Engineering; 1999; pp. 389-428,vol. 41, Issue 3-4.
Rouholahnejad, F. et al., "Narrowly Distributed Polyethylene via Reversible Chain Transfer to Aluminum by a Sterically Hindered Zirconocene/MAO," Organometallics; 2010, pp. 294-302, vol. 29, No. 2.
Wei, J. et al., "Aufbaureaktion Redux: Scalable Production of Precision Hydrocarbons from AlR3 (R=Et or iBu) by Dialkyl Zinc Mediated Ternary Living Coordinative Chain-Transfer Polymerization," Angew. Chem. Int. Ed.; 2010, pp. 1768-1772, vol. 49.
Written Opinion; International Application No. PCT/EP2015/081207; International Filing Date: Dec. 23, 2015; dated Apr. 22, 2016; 7 pages.
Xu, Guangxue and T.C. Chung, "Borane Chain Transfer Agent in Metallocene-Mediated Olefin Polymerization. Synthesis of Borane-Terminated Polyethylene and Diblock Copolymers Containing Polyethylene and Polar Polymer" J. Am. Chem. Soc., 1999, 121, pp. 6763-6764.
Xu, Guangxue and T.C. Chung, "Synthesis of Syndiotactic Polystyrene (s-PS) Containing a Terminal Polar Group and Diblock Copolymers Containing s-PS and Polar Polymers," Macromolecules; 1999, pp. 8689-8692, vol. 32.
Zhang et al., "Highly Efficient, Living Co. Chain-Transfer Polymerization of Propene w/ ZnEt2: Pract Prod of Ultrahigh to Very Low Molecular Weight morphous Atactic Polypropenes of Extrem. Narrow Polydispersity," J. Am. Chem.; 2008, pp. 442-443, vol. 130.
Chung, T.C., "Synthesis of Functional Polyolefin Copolymers With Graft and Block Structures," Prog. Polymer Science 27 (2002) pp. 39-85.
Nam et al., "Propene Polymerization with Stereospecific Metallocene Dichloride—[Ph3C] [B(C6F5)4] Using a-Alkenylaluminum as an Alkylation Reagent and as a Functional Comonomer," Macromolecules (2002), No. 35, pp. 6760-6762, 3 pages.
Third Party Communication as submitted for EPO Application No. EP14200124.7, dated Jul. 31, 2018.

* cited by examiner

| Formula | Structure |
|---|---|
| I-A | $X = Y$ |
| I-B | $X \equiv Y$ |
| I-C | $Y = X = Z^1$ |
| I-D | $Y - X \equiv Z^1$ |
| I-E | $\begin{array}{c} Z^1 \\ \diagup \diagdown \\ X - Y \end{array}$ |
| I-F | $\begin{array}{c} Z^1 \\ \mid \\ Y = X \diagdown Z^2 \end{array}$ |
| I-G | $\begin{array}{c} Z^1 \\ \parallel \\ Y = X = Z^2 \end{array}$ |

PROCESS FOR THE PREPARATION OF A POLYOLEFIN HAVING ONE OR MULTIPLE END-FUNCTIONALIZED BRANCHES

This application is a national stage application of PCT/EP2015/081207, filed Dec. 23, 2015, which claims priority to European Patent Application Number 14200124.7 filed Dec. 23, 2014, both of which are hereby incorporated by reference in their entirety.

The present invention relates to a process for the preparation of polyolefins having end-functionalized branches via the copolymerization of an olefin monomer and a main group metal hydrocarbyl chain transfer agent according to Formula 1a. The invention moreover relates to branched polyolefin having end-functionalized branches obtained by said process.

BACKGROUND

The present invention relates to the preparation of a polyolefin having end-functionalized branches, the intermediate products and the processes to obtain these products.

Commercially available polyethylene and polypropylene prepared using standard procedures with Ziegler-Natta or metallocene catalysts have a predominantly linear molecular structure. Although linear polyolefins have many desirable physical properties, they show a variety of melt processing shortcomings, especially the metallocene prepared ones having narrow molecular weight distributions, which typically have a low melt strength. Low melt strength is a problem because it causes local thinning in melt thermoforming, relative weakness in large-part blow molding and flow instabilities in co-extrusion of laminates.

One way of overcoming the shortcomings of linear polyolefins is by means of branching, viz. the provision of polymer side chains extending from the polyolefin backbone.

In the prior art different approaches have been developed to prepare branched polyolefins including methods based on chain transfer concepts.

Despite their ubiquitous presence in our society, polyolefins such as polyethylene and polypropylene are not appropriate for several applications as a consequence of their inherently nonpolar character. This nonpolar character is the reason for the poor adhesion, printability and compatibility that can restrict their efficacy. Hence, it is further desirable to prepare polyolefins having end-functionalized branches with for example polar end groups so that the polyolefins having end-functionalized branches also exhibit good adhesion and printability.

In the prior art different approaches have been developed to prepare polyolefins with functionalized branches. One method entails the copolymerization of olefins with protected heteroatom-containing functionalized olefin comonomers to afford after hydrolysis a short chain branched polyolefin with functionalized short chain branches. Alternatively, a copolymerization of an olefin and an aluminum-containing olefinic comonomer is carried out, which, after oxidation with oxygen, affords a short chain branched polyolefin with functionalized short chain branches.

This invention is directed towards an improved process for the preparation of branched polyolefins having end-functionalized branches.

With "polyolefin having branches" is meant a polyolefin having one or multiple branches.

It is an aim of the present invention to provide a process for the preparation of polyolefins having one or multiple main group metal end-functionalized branches.

It is an aim of the present invention to provide a process for the preparation of polyolefins having one or multiple end-functionalized branches.

It is moreover an aim of the present invention to provide polyolefins having one or multiple end-functionalized branches One or more of these aims are obtained by the catalyst system according to the present invention.

One or more of these aims are obtained by the process according to the present invention.

SUMMARY OF THE INVENTION

The present invention relates to the novel and inventive process using chain transfer polymerization to prepare a polyolefin having one or multiple main group metal end-functionalized branches (viz. a main group metal-ended hydrocarbyl chain growth product) and a subsequent oxidation reaction as well as a quenching step to provide branched polyolefin having one or multiple end-functionalized branches, with a preferably polar function at the chain end(s).

In a first aspect, the present invention relates to a process for the preparation of a polyolefin having one or multiple end-functionalized branches, said process comprising the step of:

A) a polymerization step comprising copolymerizing at least one first type of olefin monomer and at least one second type of olefin monomer containing a main group metal hydrocarbyl chain transfer agent functionality according to Formula 1a: $R^{100}_{(n-2)}R^{101}M^{n+}R^{102}$ using a catalyst system to obtain a polyolefin having one or multiple main group metal end-functionalized branches; wherein said catalyst system comprises:
  i) a metal catalyst or catalyst precursor comprising a metal from Group 3-10 of the IUPAC Periodic Table of elements, and
  ii) optionally a co-catalyst;
  iii) optionally an additional chain transfer and/or chain shuttling agent;
  wherein M is a main group metal; n is the oxidation state of M; $R^{100}$, $R^{101}$ and $R^{102}$ of Formula 1a are each independently selected from the group consisting of a hydride, a C1-C18 hydrocarbyl group, or a hydrocarbyl group Q on the proviso that at least one of $R^{100}$, $R^{101}$ and $R^{102}$ is a hydrocarbyl group Q, wherein hydrocarbyl group Q is according to Formula 1 b:

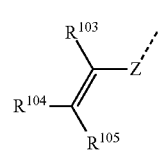

(Formula 1b)

wherein Z is bonded to M and Z is a C1-C18 hydrocarbyl group; $R^{105}$ optionally forms a cyclic group with Z; wherein $R^{103}$ and $R^{104}$ and $R^{105}$ are each independently selected from hydrogen or a hydrocarbyl group;

B) an oxidizing step comprising contacting said polyolefin having one or multiple main group metal end-functionalized branches obtained in step A) with an oxidizing agent to obtain a polyolefin having one or multiple main group metal end-functionalized oxidized branches;

C) contacting said polyolefin having one or multiple main group metal end-functionalized oxidized branches obtained in step B) with a quenching agent to remove the main group metal from the oxidized branch ends to obtain a polyolefin having one or multiple end-functionalized branches.

The chain transfer agent functionality can also be a chain shuttling agent functionality.

In an embodiment, at least one of $R^{100}$, $R^{101}$ and $R^{102}$ of Formula 1a is a hydrocarbyl group Q and the remaining groups of $R_{100}$, $R^{101}$ and $R^{102}$ are each a C1-C10 hydrocarbyl group or wherein two groups of $R^{100}$, $R^{101}$ and $R^{102}$ are each a hydrocarbyl group Q and the remaining group of $R^{100}$, $R^{101}$ and $R^{102}$ is a C1-C10 hydrocarbyl group, preferably a C1-C4 hydrocarbyl group, or wherein all of $R^{100}$, $R^{101}$ and $R^{102}$ are a hydrocarbyl group Q.

In an embodiment, the hydrocarbyl group Q according to Formula 1 b is a linear α-olefin group or a cyclic unsaturated hydrocarbyl group, preferably for example oct-7-en-1-yl, 5-alkylenebicyclo[2.2.1]hept-2-ene or 5-alkylene-2-norbornene. A cyclic unsaturated hydrocarbyl group can thereby lead for example to a high reactivity.

In an embodiment, an olefin monomer comprising a main group metal hydrocarbyl chain transfer agent can be selected from the group consisting of bis(isobutyl)(5-ethylen-yl-2-norbornene) aluminum, di(isobutyl)(7-octen-1-yl) aluminum, di(isobutyl)(5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris(3-buten-1-yl) aluminum, ethyl(5-ethylen-yl-2-norbornene) zinc, ethyl(7-octen-1-yl) zinc, ethyl(5-hexen-1-yl) zinc, ethyl(3-buten-1-yl) zinc, bis(5-ethylen-yl-2-norbornene) zinc, bis(7-octen-1-yl) zinc, bis(5-hexen-1-yl) zinc, or bis(3-buten-1-yl) zinc.

In an embodiment, the co-catalyst is selected from the group consisting of MAO, DMAO, MMAO, SMAO and fluorinated aryl borane or fluorinated aryl borate.

In an embodiment, the metal catalyst or metal catalyst precursor used in step A) comprises a metal from Group 3-8 of the IUPAC Periodic Table of elements, more preferably from Group 3-6 and/or wherein the metal catalyst or metal catalyst precursor used in step A) comprises a metal selected from the group consisting of Ti, Zr, Hf, V, Cr, Fe, Co, Ni, Pd, preferably Ti, Zr or Hf.

In an embodiment, said metal catalyst is a Group 4 single-site catalyst, which can be a metallocene or a post-metallocene.

In an embodiment, said catalyst precursor is a $C_s$-, $C_1$- or $C_2$-symmetric zirconium metallocene, preferably an indenyl substituted zirconium dihalide, more preferably a bridged bis-indenyl zirconium dihalide, even more preferably rac-dimethyl silyl bis-indenyl zirconium dichloride (rac-Me$_2$Si (Ind)$_2$ZrCl$_2$) or rac-dimethylsilyl bis-(2-methyl-4-phenyl-indenyl) zirconium dichloride (rac-Me$_2$Si(2-Me-4-Ph-Ind)$_2$ZrCl$_2$).

In an embodiment, said metal catalyst precursor is [Me$_2$Si (C$_5$Me$_4$)N(tBu)]TiCl$_2$.

In an embodiment, said metal catalyst precursor is [N-(2,6-di(1-methylethyl)phenyl)amido)(2-isopropylphenyl)(α-naphthalen-2-diyl(6-pyridin-2-diyl)methane]hafnium dimethyl.

In an embodiment, the catalyst system used in step A) further comprises an additional main group metal hydrocarbyl chain transfer agent or main group metal hydrocarbyl chain shuttling agent, selected from the group consisting of hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and a combination thereof. An additional main group metal hydrocarbyl chain transfer agent can also be a chain shuttling agent.

In an embodiment, the at least one olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclopentene, cyclohexene, norbornene, ethylidene-norbornene, and vinylidene-norbornene and one or more combinations thereof.

In an embodiment, the reagent in step B) is an oxidizing agent according to Formula I:

$$XY_aZ^1_bZ^2_c \quad \text{Formula I}$$

wherein a, b and c are each independently 0 or 1 and X, Y, $Z^1$ and $Z^2$ are each independently selected from carbon, hydrocarbyl, heteroatom and halogen.

In an embodiment, the oxidizing agent has a structure according to Formula I with the proviso that when a is 1 and b is 0 and c is 0, the formula is XY, then:
when X is the same as Y, then X and Y are selected from the group consisting of 0 (Formula I-A in FIG. 1) and Cl, Br, I, and F (Formula I-H in FIG. 1) and;
when X is different from Y then:—when X is C, and Y is O or NR$^2$ (Formula I-B in FIG. 1).

In an embodiment, the oxidizing agent has a structure according to Formula I with the proviso that when a is 1 and b is 1 and c is 0, and Y and $Z^1$ are each bonded to X, the formula is XYZ$^1$ (Formula I-C in FIG. 1) then:
when X is C, then Y is S, O or NR$^2$ and $Z^1$ is O, S or NR$^3$;
when X is CH$_2$; Y is CR$^2$ and $Z^1$ is COOR$^3$, C(=O)NR$^3$R$^4$ or P(=O)(OR$^3$)OR$^4$;
when X and $Z^1$ are bonded to Y and X is O, then Y is O and $Z^1$ is O or Y is N and $Z^1$ is N.

In an embodiment, the oxidizing agent has a structure according to Formula I with the proviso that when a is 1 and b is 1 and c is 0, and Y and $Z^1$ are each bonded to X, when the formula is XYZ$^1$ (Formula I-D in FIG. 1) then:
when X is C, Y is R$^2$ and $Z^1$ is N.

In an embodiment, the oxidizing agent has a structure according to Formula I with the proviso that when a is 1 and b is 1 and c is 0 and X, Y and $Z^1$ form a cyclic structure (Formula I-E in FIG. 1) then:
when X is C=O, Y is R$^2$ and $Z^1$ is C(=O)O;
when X is C(R$^2$)(R$^3$), Y is C(R$^4$)(R$^5$) and $Z^1$ is O or NR$^6$.

In an embodiment, the oxidizing agent has a structure according to Formula I with the proviso that when a is 1, b is 1 and c is 1 and Y, $Z^1$ and $Z^2$ are each bonded to X, the formula is X(Y)(Z$^1$)(Z$^2$) (Formula I-F in FIG. 1) then:
when X is C and Y is O, then $Z^1$ is R$^2$ and $Z^2$ is R$^3$;
when X is C and Y is NR$^2$, then $Z^1$ is R$^3$ and $Z^2$ is R$^4$;
when X is C and Y is O, then $Z^1$ is OR$^2$ and $Z^2$ is Cl.

In an embodiment, the oxidizing agent has a structure according to Formula I with the proviso that when a is 1, b is 1 and c is 1 and Y, $Z^1$ and $Z^2$ are each bonded to X by double bonds, the formula is X(Y)(Z$^1$)(Z$^2$) (Formula I-G in FIG. 1) then:
when X is S, then Y, $Z^1$ and $Z^2$ are each O.
wherein R$^2$, R$^3$, R$^4$, R$^5$, R$^6$ are each independently selected from the group consisting of H, SiR$^7_3$, SnR$^7_3$ and a C1-C16 hydrocarbyl, preferably a C1-C4 hydrocarbyl, where $R^7$ is independently selected from the group consisting of a hydride, a halide and a C1-C16 hydrocarbyl.

In an embodiment, the oxidizing agent used in step B) is selected from the group consisting of fluorine, chlorine, iodine, bromine, $O_2$, CO, $O_3$, $CO_2$, $CS_2$, COS, $R^2NCO$, $R^2NCS$, $R^2NCNR^3$, $CH_2=C(R^2)C(=O)OR^3$, $CH_2=C(R_2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R4C=NR^2$, $R^2C(=O)R^3$, ClC(=O)$OR^2$ and $SO_3$, preferably $O_2$, $O_3$, $N_2O$, $CO_2$ and $SO_3$, even more preferably $O_2$ and $CO_2$.

In a second aspect, the invention relates to a polyolefin having one or multiple end-functionalized branches, having a number average molecular weight ($M_n$) between 500 and 1,000,000 g/mol and having a polydispersity index ($Đ$) of between 1.1 and 10.0 and wherein said polyolefin has a degree of functionalization of at least 30%, wherein said polyolefin having one or multiple end-functionalized branches is according to Pol-$XY_aZ^1_bZ^2_cR^1_d$ (Formula 1.1), wherein a, b, c and d are each independently 0 or 1 and X, Y, $Z^1$, $Z^2$ are each independently selected from carbon, hydrocarbyl, heteroatom and halogen and R1 is hydride or hydrocarbyl.

In an embodiment, said polyolefin is according to Pol-$XY_aZ^1_bZ^2_cR^1_d$ (Formula 1.1), wherein a, b and d are 1, c is 0, and X is C, Y and $Z^1$ are O and $R^1$ is H.

In an embodiment, said polyolefin having one or multiple end-functionalized branches is according to Pol-$XY_aZ^1_bZ^2_cR^1_d$ (Formula 1.1) with the proviso that when a is 0, b is 0, c is 0, and d is 1, the polyolefin has the formula Pol-$XR^1$, and then: X is O or S.

In an embodiment the polyolefin having one or multiple end-functionalized branches is according to Formula I.I with the proviso that when a is 1, b is 0, c is 0, and d is 1, the polyolefin has the formula Pol-$XYR^1$, and then: X is C, then Y is $NR^2$ or O.

In an embodiment the polyolefin having one or multiple end-functionalized branches is according to Formula 1.1 with the proviso when a is 1, b is 1, c is 0 and d is 1, the polyolefin has the formula Pol-$XYZ^1R^1$ and then:
when X is C and Y is O, S, $NR^2$ then $Z^1$ is O, S;
when X is C and Y is $^R_2$, then $Z^1$ is N;
when X is C and Y is (=$NR^2$), then $Z^1$ is $NR^3$.
when X is $C(R^2)(R^3)$, Y is $C(R^4)(R^5)$ and $Z^1$ is O or $NR^6$;
when X is $CH_2$, Y is $C(R^2)$ and $Z^1$ is C(OR$^3$)O or C($NR^3R^4$)O or P(OR$^3$)(OR$^4$)O;
when X is C=O, Y is $R^2$ and $Z^1$ is COO, In an embodiment the polyolefin having one or multiple end-functionalized branches is according to Formula 1.1 with the proviso that when a is 1, b is 1, c is 1 and d is 1, the polyolefin has the formula Pol-$XYZ^1Z^2R^1$, and then:
when X is S, Y is O, $Z^1$ and $Z^2$ is O;
when X is C, Y is O and $Z^1$ is $R^2$ and $Z^2$ is $R^3$;
when X is C, Y is $NR^2$ and $Z^1$ is $R^3$ and $Z^2$ is $R^4$.

In an embodiment the polyolefin having one or multiple end-functionalized branches is according to Formula 1.1 with the proviso that when a is 1, b is 1, c is 0 and d is 0, the polyolefin has the formula Pol-$XYZ^1$, and then: when X is C, Y is O and $Z^1$ is $OR^2$.

In an embodiment the polyolefin having one or multiple end-functionalized branches is according to Formula 1.1 with the proviso that when a is 0, b is 0, c is 0 and d is 0, the polyolefin has the formula Pol-X, and then: X is Cl, Br, F or I. In an embodiment, the polyolefin having one or multiple functionalized branches is according to Formula 1.1 with the proviso that when a and b are each 1, c is 0 and d is 1, and X is C, Y is O and $Z^1$ is O and $R^1$ is H.

Wherein $R^1$, $R^2$, $R^3$, $R^4$, $R^5$, $R^6$ are each independently selected from the group consisting of H, $SiR^7_3$, $SnR^7_3$ and a C1-C16 hydrocarbyl, preferably a C1-C4 hydrocarbyl, and wherein $R^7$ is selected from the group consisting of C1-C16 hydrocarbyl, hydride, halide and silylhydrocarbyl.

During step C) a quenching agent is used to remove the main group metal from the oxidized branch ends to obtain a branched polymer, preferably with polar functions at the chain ends.

In an embodiment, the reagent is a protic reagent. In a preferred embodiment the protic agent is water or an alcohol or a mixture thereof, preferably water.

It is possible that in a specific embodiment instead of a hydrolysis another type of quenching step is carried out to detach the main group metal from the polymer chain. Said step is then preferably carried out using a non-protic metal-substituting agent.

In an embodiment, said quenching agent is typically a halogen-containing agent releasing a metal-halide or an anhydride releasing a metal-carboxylate. Typical examples are alkyl halides and anhydrides.

Preferably the main group metal(s) to be used according to the present invention can be selected for example from: lithium (Li), sodium (Na), potassium (K), beryllium (Be), magnesium (Mg), calcium (Ca), boron (B), aluminum (Al), gallium (Ga), indium (In), germanium (Ge), and tin (Sn), antimony (Sb), and bismuth (Bi) and/or zinc (Zn), preferably from lithium (Li), sodium (Na), potassium (K), beryllium (Be), magnesium (Mg), calcium (Ca), aluminum (Al), gallium (Ga), indium (In), germanium (Ge), and tin (Sn), antimony (Sb), and bismuth (Bi) and/or zinc (Zn), further preferred from aluminum (Al) and/or zinc (Zn) and/or magnesium (Mg).

Preferably the catalyst to main group metal mole ratio can be for example <10, between 5 and 45, preferably between 15 and 35, >40, between 50 and 90, preferably between 60 and 80, >100. This may influence the structure of the produced polymer.

A branched polymer, preferably with polar functions at the chain ends obtained according to the present invention can be especially for example a branched polymer with long chain branches (LCB) and/or a hyper branched polymer. The present invention thus also concerns the use of a corresponding process to obtain for example polymers with long chain branches (LCB) and/or a hyper branched polymers.

The present invention will be described in more detail below.

DEFINITIONS

The following definitions are used in the present description and claims to define the stated subject matter. Other terms not cited below are meant to have the generally accepted meaning in the field.

"chain-end-functionalized polyolefin" or "end group-functionalized polyolefin" as used in the present description means: a polyolefin having a functional group on one or both of the ends of the polymer main chain.

"main chain" as used in the present description means: the linear polymer chain to which all other chains may be regarded as being pendant. The main chain is preferably also the polymer chain starting from which other chains/side chains may be obtained. The main chain is thus obtained in step A).

"side chain" or "branch" or "polymer branch" or "polymer side chain" as used in the present description means: an offshoot from a polymer main chain. These terms can be used interchangeably. This offshoot may be oligomer or polymeric and might be similar or different in nature compared to the polymer main chain. A "side chain" or "branch" or "polymer branches" or "polymer side chains" can thereby also be a random or block copolymer comprising at least two different monomers. "Side-chains" can be obtained starting from the main chain, especially starting from the monomers comprising a main group metal chain transfer agent functionality. "Side-chains" can thereby be obtained together with the main chain in step A).

"long chain branch" as used in the present description means side chain with a length resembling the length of the main chain, that can mean that a long chain branch can have a length corresponding at least to 20% of the length of the backbone in terms of monomer units and/or average molecular weight (Mn or Mw). A long chain branch can also preferably for example comprise >100 carbon atoms in the backbone of the long chain branch. A long chain branch can also preferably for example long enough for entanglement phenomena, preferably involving the branch, to occur.

"hyper branched polymer" in the sense of the present invention can mean that each branch coming from the main chain of the polymer also comprises at least 1, at least 2 and/or more branches.

"polyolefin having one or multiple end-functionalized branches" or "end group-functionalized branched polyolefin" as used in the present description means: a branched polyolefin having a functional groups at the end of the polymer side chains.

"olefin monomer" or "olefin" as used in the present description means: an a hydrocarbon compound having a carbon-carbon double bond that can be used serves as a building block for a polyolefin.

"α-olefin" as used in the present description means: an olefin having a double bond at the α position.

"polyolefin" as used in the present description means: a polymer obtained by the polymerization of olefin monomer.

"polymer chain" as used in the present description means: a chain having a number average molecular weight ($M_n$) of at least 500 g/mol.

"copolymer" as used in the present description means: a polymer derived from more than one type of monomer.

"polyolefin having one or multiple main group metal end-functionalized branches" as used in the present description means: one or more main group metals comprising as a ligand a polyolefin having one or more branches obtained by chain transfer polymerization. This can be depicted by M-Pol. This can e.g. be an Al-terminated or Al-ended branched polyolefin, or a Zn-terminated or Zn-ended branched polyolefin.

"main group metal hydrocarbyl branched growth product" as used in the present description means: a main group metal comprising as a ligand a hydrocarbyl chain obtained by chain transfer polymerization (in this case the polyolefin). Said hydrocarbyl chain is a polyolefin chain. In other words, "main group metal hydrocarbyl branched growth product" can have a main group metal at at least one of its chain ends and can be considered synonymous to "main group metal-terminated polyolefin" and "main group metal-functionalized polyolefin."

"polyolefin having one or multiple main group metal end-functionalized oxidized branches" as used in the present description means: a polyolefin that has one or multiple branches of which one or multiple branches have been oxidized and comprise a main group metal end-function. This polyolefin can be depicted by M-Ox-Pol, wherein M is a main group metal, wherein Ox is a heteroatom, selected from O, S or N, or a heteroatom containing fragment, for example but not limited to:

—O—
—C(=O)—
—C(=NR$^2$)—
—C(=O)O—
—C(=S)S—
—C(=O)S—
—C(=S)O—
—C(=O)NR$^2$—
—C(=NR$^2$)O—
—C(=S)NR$^2$—
—C(=NR$^2$)S—
—CH$_2$—C(R$^2$)=C(OR$^3$)O—
—CH$_2$—C(R$^2$)=C(NR$^3$R$^4$)O—
—CH$_2$—C(R$^2$)=P(OR$^3$)(OR$^4$)O—
—C(=NR$^3$)NR$^2$—
—C(=NR$^2$)NR$^3$—
—C(R$^2$)=N—
—C(R$^2$)(R$^3$)C(R$^4$)(R$^5$)O—
—C(R$^2$)(R$^3$)C(R$^4$)(R$^5$)NR$^6$—
—C(=O)—R$^2$—C(=O)O—
S—C(R$^3$R$^4$)—N(R$^2$)—
—S(=O)$_2$O—
—C(R$^2$)(R$^3$)O— where R$^2$, R$^3$, R$^4$, R$^5$ and R$^6$ are each independently selected from hydrogen, SiR$_3^7$, SnR$_3^7$ or a C1-C16 hydrocarbyl, preferably selected from hydrogen or C1-10 hydrocarbyl; where each R$^7$ is independently selected from hydride, halide or C1-C16 hydrocarbyl on the proviso that at least one of R$^7$ is C1-C16 hydrocarbyl.

"polyolefin having one or multiple oxidized branch ends as used in the present description means: a polyolefin that has one or multiple branches of which one or multiple branches have been oxidized. This polyolefin can be depicted by Pol-(Ox-R$^1$)$_n$, wherein R$^1$ is hydrogen or SiR$_3^7$, SnR$_3^7$ or a C1-C16 hydrocarbyl, M is a main group metal, wherein Ox is a heteroatom, selected from O, S or N, or a heteroatom containing fragment, and n is the number of main group metal end-functionalized oxidized branches, for example but not limited to:

—O—
S—C(=O)—
—C(=NR$^2$)—
—C(=O)O—
—C(=S)S—
—C(=O)S—
—C(=S)O—
—C(=O)NR$^2$—
—C(=NR$^2$)O—
—C(=S)NR$^2$—
—C(=NR$^2$)S—
—CH$_2$—C(R$^2$)=C(OR$^3$)O—
—CH$_2$—C(R$^2$)=C(NR$^3$R$^4$)O—
—CH$_2$—C(R$^2$)=P(OR$^3$)(OR$^4$)O—
—C(=NR$^3$)NR$^2$—
—C(=NR$^2$)NR$^3$—
—C(R$^2$)=N—
—C(R$^2$)(R$^3$)C(R$^4$)(R$^5$)O—
—C(R$^2$)(R$^3$)C(R$^4$)(R$^5$)NR$^6$—
—C(=O)—R$^2$—C(=O)O—
—C(R$^3$R$^4$)—N(R$^2$)—
—S(=O)$_2$O—
—C(R$^2$)(R$^3$)O— where $R^2$, $R^3$, $R^4$, $R^5$ and $R^6$ are each independently selected from hydrogen or $SiR^7_3$, $SnR^7_3$ or a C1-C16 hydrocarbyl, preferably selected from hydrogen or C1-C16 hydrocarbyl; where each $R^7$ is independently selected from hydride, halide or C1-C16 hydrocarbyl.

"copolymerization" as used in the present description means: a process to produce a copolymer wherein at least two different types of monomers are used.

"Pol" as used in the present description means: polyolefin.

"PE" as used in the present description means: polyethylene.

"LDPE" as used in the present description means: low density polyethylene. and "LLDPE" as used in the present description means: linear low density polyethylene. LDPE and LLDPE thereby encompass polyethylene with a density for example between 0.85 and 0.95 kg/m³, that can thus also includes especially for example VLDPE and MDPE.

"HDPE" as used in the present description means: high density polyethylene.

"aPP" as used in the present description means: atactic polypropylene.

"iPP" as used in the present description means: isotactic polypropylene.

"sPP" as used in the present description means: syndiotactic polypropylene.

"P4M1P" as used in the present description means: poly-4-methyl-1-pentene.

"HT SEC" as used in the present description means: high temperature size exclusion chromatography. Size exclusion chromatography can be used as a measure of both the size and the polydispersity of a polymer.

"polydispersity index ($Đ$)" as used in the present description means: a value that indicates the distribution of the sizes of polymer molecules ($M_w/M_n$). The method of measuring the $Đ$ is explained below. $M_n$ is the number average molecular weight and $M_w$ is the weight average molecular weight.

"chain transfer agent" as used in the present description means: a compound that is capable of reversibly or irreversibly interchanging hydrocarbyls and/or hydrocarbyl chains with the active catalyst. It is a metal compound comprising at least one ligand with a weak chemical bond.

"chain transfer polymerization" as used in the present description can mean: a polymerization reaction by which the growing polymer chain is transferred to another molecule, being the chain transfer agent. During this process a hydrocarbyl group is transferred back to the active catalyst. This process can be either reversible or irreversible. When reversible, the chain transfer agents can create a controlled, living-like system.

"main group metal hydrocarbyl chain transfer agent" or "chain transfer agent" as used in the present description means: a compound that is capable of reversibly or irreversibly interchanging hydrocarbyls and/or hydrocarbyl chains with the active catalyst or other chain transfer agents. It may be a metal compound with at least one ligand with a weak chemical bond, preferably a chain transfer agent based on a main group metal having at least one hydrocarbyl as ligand.

"main group metal hydrocarbyl chain transfer agent functionality" or "chain transfer agent functionality" as used in the present description means: a functionality of an olefin monomer that is capable of reversibly or irreversibly interchanging hydrocarbyls and/or hydrocarbyl chains with the active catalyst or other chain transfer agents. It may be a functionality comprising a metal compound with at least one ligand with a weak chemical bond, preferably a chain transfer agent based on a main group metal having at least one hydrocarbyl as ligand. If talking about an olefin or olefin monomer comprising a chain transfer agent, a corresponding functionality can be meant.

"chain shuttling agent" as used in the present description means: a compound that is capable of reversibly interchanging hydrocarbyls and/or hydrocarbyl chains with catalysts or other chain transfer agents. It is a metal compound comprising at least one ligand with a weak chemical bond. A chain shuttling agent can thus be a chain transfer agent.

"hydrocarbyl chain transfer agent" as used in the present description means: a chain transfer agent having at least one hydrocarbyl as ligand.

"additional chain transfer agent" as used in the present description means: a chain transfer agent that is present in addition to another chain transfer agent and/or to an olefin monomer comprising a chain transfer agent functionality.

"catalyst system" as used in the present description means: a combination of at least two components selected from the group consisting of: a metal catalyst or a metal catalyst precursor, a co-catalyst, one or more types of chain transfer agents, optionally one or more other components etc. A catalyst system always includes a metal catalyst or a metal catalyst precursor.

"catalyst" as used in the present description means: a species providing the catalytic reaction.

"metal catalyst" as used in the present description means: a catalyst providing the catalytic reaction, wherein said catalyst comprises at least one metal center that forms the active site. In the context of the present invention a "metal catalyst" is the same as a "transition metal catalyst" wherein the metal is a transition metal.

"catalyst precursor" as used in the present description means: a compound that upon activation forms the active catalyst.

"single-site catalyst" as used in the present description means: a metal catalyst that consists of solely one type of catalytically active site.

"metallocene" as used in the present description means: a metal catalyst or catalyst precursor typically consisting of two substituted cyclopentadienyl (Cp) ligands bound to a metal active site.

"post-metallocene" as used in the present description means: a metal catalyst containing one or more anions bound to the metal active site, typically via a hetero atom, that are not substituted cyclopentadienyl (Cp) ligands.

"transition metal" as used in the present description means: a metal from any of the Groups 3-10 of the IUPAC Periodic Table of elements or in other words a Group 3 metal, a Group 4 metal, a Group 5 metal, a Group 6 metal, a Group 7 metal, a Group 8 metal, a Group 9 metal or a Group 10 metal.

"Group 3 metal" as used in the present description means: a metal selected from Group 3 of the IUPAC Periodic Table of elements, being scandium (Sc), yttrium (Y), lanthanum (La) and other lanthanides (Ce—Lu), and actinium (Ac) and other actinides (Th—Lr).

"Group 4 metal" as used in the present description means: a metal selected from Group 4 of the IUPAC Periodic Table of elements, being titanium (Ti), zirconium (Zr) and hafnium (Hf).

"Group 5 metal" as used in the present description means: a metal selected from Group 5 of the IUPAC Periodic Table of elements, being vanadium (V), niobium (Nb) and tantalum (Ta).

"Group 6 metal" as used in the present description means: a metal selected from Group 6 of the Periodic Table of elements, being chromium (Cr), molybdenum (Mo) and tungsten (W).

"Group 7 metal" as used in the present description means: a metal selected from Group 7 of the Periodic Table of elements, being manganese (Mn), technetium (Tc) and rhenium (Re).

"Group 8 metal" as used in the present description means: a metal selected from Group 8 of the Periodic Table of elements, being iron (Fe), ruthenium (Ru) and osmium (Os).

"Group 9 metal" as used in the present description means: a metal selected from Group 9 of the Periodic Table of elements, being cobalt (Co), rhodium (Rh) and iridium (Ir).

"Group 10 metal" as used in the present description means: a metal selected from Group 10 of the Periodic Table of elements, being nickel (Ni), palladium (Pd) and platinum (Pt).

"co-catalyst" as used in the present description means a compound that activates the catalyst precursor to obtain the active catalyst.

"Lewis base ligand" as used in the present description means: a group that is capable of coordinating to the transition metal of a metal catalyst or metal catalyst precursor.

"main group metal" or "main group" as used in the present description refers to/means: a metal that is an element of groups 1, 2, and 13-15 of the period table. In other words, metals of:
Group 1: lithium (Li), sodium (Na), and potassium (K)
Group 2: beryllium (Be), magnesium (Mg), and calcium (Ca)
Group 13: boron (B), aluminum (Al), gallium (Ga), and indium (In)
Group 14: germanium (Ge), and tin (Sn)
Group 15: antimony (Sb), and bismuth (Bi)
main group metals also include for the context of the present invention zinc (Zn), of the IUPAC Periodic Table of elements.

"oxidizing agent" as used in the present description means: an agent or a reagent that is suitable for oxidizing the bond between the main group metal center of the chain transfer agent and the hydrocarbyl chain of the main group metal end-functionalized branches.

"methylaluminoxane" or "MAO" as used in the present description means: a compound derived from the partial hydrolysis of trimethyl aluminum that serves as a co-catalyst for catalytic olefin polymerization.

"supported methylaluminoxane" or "SMAO" as used in the present description means: a methylaluminoxane bound to a solid support.

"depleted methylaluminoxane" or "DMAO" as used in the present description means: a methylaluminoxane from which the free trimethyl aluminum has been removed.

"modified methylaluminoxane" or "MMAO" as used in the present description means: modified methylaluminoxane, viz. the product obtained after partial hydrolysis of trimethyl aluminum plus another trialkyl aluminum such as tri(isobutyl) aluminum or tri-n-octyl aluminum.

"fluorinated aryl borates or fluorinated aryl boranes" as used in the present description means: a borate compound having three or four fluorinated (preferably perfluorinated) aryl ligands or a borane compound having three fluorinated (preferably perfluorinated) aryl ligands.

"halide" as used in the present description means: an ion selected from the group of: fluoride (F—), chloride (Cl—), bromide (Br—) or iodide (I—).

"halogen" as used in the present description means: an atom selected from the group of: fluorine (F), chlorine (Cl), bromine (Br) or iodine (I).

"heteroatom" as used in the present description means: an atom other than carbon or hydrogen. Heteroatom also includes halides.

"heteroatom selected from Group 14, 15 or 16 of the IUPAC Periodic Table of the Elements" as used in the present description means: a hetero atom selected from Si, Ge, Sn [Group 14], N, P, As, Sb, Bi [Group 15], 0, S, Se, Te [Group 16].

"hydrocarbyl" as used in the present description means: a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents. Hence, when in the present description "hydrocarbyl" is used it can also be "substituted hydrocarbyl", unless stated otherwise. Included in the term "hydrocarbyl" are also perfluorinated hydrocarbyls wherein all hydrogen atoms are replaced by fluorine atoms. A hydrocarbyl may be present as a group on a compound (hydrocarbyl group) or it may be present as a ligand on a metal (hydrocarbyl ligand).

"hydrocarbyl chain" as used in the present description can mean: the hydrocarbyl product of a polymerization reaction according to step A) of the present invention. It may be a oligomeric polyolefin chain having e.g. between 2 and 20 olefin units or it may be a polyolefin chain, i.e. consisting of more than 20 olefin units. It should be noted that "hydrocarbyl chain" and "hydrocarbyl" are not used as synonyms.

"alkyl" as used in the present description means: a group consisting of carbon and hydrogen atoms having only single carbon-carbon bonds. An alkyl group may be straight or branched, un-substituted or substituted. It may contain aryl substituents. It may or may not contain one or more heteroatoms, such as for example oxygen (O), nitrogen (N), phosphorus (P), silicon (Si), tin (Sn) or sulfur (S) or halogens (i.e. F, Cl, Br, I).

"aryl" as used in the present description means: a substituent derived from an aromatic ring. An aryl group may or may not contain one or more heteroatoms, such as for example oxygen (O), nitrogen (N), phosphorus (P), silicon (Si), tin (Sn) or sulfur (S). An aryl group also encloses substituted aryl groups wherein one or more hydrogen atoms on the aromatic ring have been replaced by hydrocarbyl groups.

"alkoxide" or "alkoxy" as used in the present description means: a substituent obtained by deprotonation of an aliphatic alcohol. It consists of an alkyl group bonded to an oxygen atom.

"aryloxide" or "aryloxy" or "phenoxide" as used in the present description means: a substituent obtained by deprotonation of an aromatic alcohol. It consists of an aryl group bonded to an oxygen atom.

"silyl group" as used in the present description means: a linear, branched or cyclic substituent containing 1-20 silicon atoms. Said silyl group may consist of Si—Si single or double bonds.

"hydride" as used in the present description means: a hydrogen anion bonded to a metal.

"quenching agent" as used in the present description means: an agent to remove the main group metal from the polyolefin having one or multiple main group metal end-functionalized oxidized branches to obtain a polyolefin having one or multiple main group metal end-functionalized oxidized branches.

Expressions like for example "C1-C16" and similar formulations may refer to a range regarding a number of carbon atoms, here for example from 1 to 16 carbon atoms.

SHORT DESCRIPTION OF THE DRAWINGS

FIG. 1 shows the structures of oxidizing reagents according to Formula I of the present invention.

DETAILED DESCRIPTION OF THE INVENTION

The key of the present invention is the copolymerization of an olefin monomer, preferably a α-olefin, and at least one type olefin monomer, preferably a α-olefin, containing a main group metal hydrocarbyl chain transfer agent functionality. The resulting main group metal hydrocarbyl growth product or in other words a polyolefin having one or multiple main group metal end-functionalized branches (for example zinc-PE, or Al—PP) of the present invention can be used in several processes. It can for example be used for the preparation of branched polyolefins having end-functionalized branches via an oxidation step.

Thus, it can be said that the end product that is desired in the present invention is a polyolefin having one or multiple end-functionalized branches, preferably with polar functions at the chain ends. An intermediate product for polyolefins is a so-called chain growth product, more specifically according to the present invention a main group metal hydrocarbyl branched growth product. In other words, a main group metal-terminated polymer. Said main group metal stabilizes said polymer chain. This intermediate product has to be oxidized and subsequently quenched to produce the desired end product.

The present invention relates to the process to prepare the intermediate species, said intermediate species, the process to prepare the end product using said intermediate species and said end product. These are all different aspects of the same invention that are linked by the same concept of using an olefincomprising chain transfer agent.

The present invention uses an olefin-comprising main group metal hydrocarbyl as chain transfer agent. In other words, the olefin-comprising main group metal hydrocarbyl can be, for example, an alkene-comprising aluminum hydrocarbyl, an alkene-comprising zinc hydrocarbyl or an alkene-comprising boron hydrocarbyl.

Step A):

The first step in the process according to the present invention is the preparation of a polyolefin having one or multiple main group metal end-functionalized branches by polymerizing at least one first type of olefin monomer, preferably a α-olefin, and at least one second type of olefin monomer, preferably a α-olefin, comprising a main group metal hydrocarbyl chain transfer agent functionality with a metal catalyst, optionally a co-catalyst and optionally one or more additional chain transfer agents and/or chain shuttling agents. In an embodiment, said main group metal hydrocarbyl chain transfer agent can for example bean alkenyl-comprising aluminum hydrocarbyl chain transfer agent.

The second type of olefin monomer cam comprise a main group metal hydrocarbyl chain transfer agent functionality, which can for example be a reactive electrophilic metal end group. The resulting polyolefin can have one or multiple main group metal end-functionalized branches has a reactive electrophilic metal end group. In other words, said main group metal hydrocarbyl chain growth product is a branched polyolefin that is functionalized on at least one of its branch ends with a main group metal.

Chain transfer polymerization is a specific type of polymerization reaction. A polymer chain grows on a catalytically active site. Said grown polymer chain is then transferred from the catalytically active site to another molecule, viz. a so-called chain transfer agent.

Chain transfer to aluminum alkyls has been reported using a variety of catalysts including metallocenes, but generally, it has some drawbacks related to the efficiency of the process and the lack of control of the polymer molecular weight. Examples of documents disclosing chain transfer to aluminum are the following publications: Kretschmer, W. P. et al, Chem. Eur. J. 2006, (12), 8969; Obenauf, J. et al, Eur. J. Inorg. Chem. 2014, 1446; Saito, J. et al, Macromolecules 2005, (38), 4955; Fan, G. et al, J. Mol. Catal. A: Chem. 2005 (236), 246; Rouholahnejad, F. et al, Organometallics 2010, (29), 294; Lieber, S. et al, Macromolecules 2000, (33), 9192; Kuhlman, R. L. et al, Macromolecules 2008, (41), 4090; and Naga, N. et al, Polymer 1998, (39), 5059.

Chain transfer to zinc alkyls has been reported. Examples of documents disclosing chain transfer to zinc are the publications of Britovsek, G. J. P. et al, J. Am. Chem. Soc. 2004, (126), 10701; Britovsek, G. J. P. et al, Angew. Chem. Int. Ed. 2002, (41), 489; Ring, J. O. et al, Macromol. Chem. Phys. 2007, (208), 896; Arriola, D. et al, Science 2006, (312), 714; Zhang, W. et al, J. Am. Chem. Soc. 2008, (130), 442 and the International application WO 2003014046.

Chain transfer to aluminum in the presence of zinc in the preparation of polypropylene has been disclosed by Wei, J. et al, Angew. Chem. Int. Ed., 2010, (49), 1768.

Chain transfer to boron is known for ethylene and propylene polymerization using a variety of catalysts including metallocenes. Examples of documents disclosing chain transfer to boron are the publications of Xu, G. et al, J. Am. Chem. Soc. 1999, (121), 6763; Chung, T. C. et al, Macromolecules 2001, (34), 8040; Lin, W. et al, J. Polym. Sci. Part A Polym. Chem. 2010, (48), 3534, Y. Lu, Y. Hu, Z. M. Wang, E. Manias, T. C. Chung, J. Polym. Sci. Part A 2002, (40), 3416; G. Xu, T. C. Chung, Macromolecules 1999, (32), 8689. The disadvantage of borane end-functionalized polymers is the relatively low reactivity of the B—C bond, which requires harsh oxidizing conditions ($H_2O_2$/NaOH) to functionalize the polymers.

Polymerization/copolymerization in step A) can preferably for example been carried out using by chain transfer polymerization.

During the polymerization reaction according to step A) a at least one olefin comprising a main group metal hydrocarbyl chain transfer agent (being for example a main group metal atom bearing one or more hydrocarbyl and/or hydride groups and at least one alkenyl group) is used. The product obtained in step A) is then a polyolefin having one or multiple main group metal end-functionalized branches (being a branched polyolefin that is functionalized on at least on of its branch ends with a main group metal). This is considered to be the main product of step A), which is an intermediate product in the process according to the present invention.

The catalyst system used in step A) comprises: i) a Group 3-10, preferably Group 3-8 and more preferably Group 3-6, metal catalyst or metal catalyst precursor; ii) optionally a co-catalyst and iii) optionally one or more additional chain transfer agents and/or chain shuttling agents. Each of these will be discussed separately below.

Olefins Suitable for Use in Step A)

Examples of suitable monomers include linear or branched α-olefins. Said olefins preferably have between 2 and 30 carbon atoms, more preferably between 2 and 20 carbon atoms. Preferably, one or more of the following are used: ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof. In addition, a combination of ethylene and/or propylene on the one and one or more other olefins on the other hand is also possible. Substituted analogues of the monomers discussed above may also be used, e.g. substituted by one or more halogens. In addition aromatic monomers can be used according to the present invention. It is also possible to use a combination of two or more olefins, such as a combination of ethylene with α-olefins to arrive at an LLDPE-block.

Chain Transfer Agents

The present invention uses at least one olefin-monomer comprising an main group hydrocarbyl chain transfer agent. The present invention may also usesaid monomer in combination with other main group metal chain transfer agents, for example, zinc, and/or magnesium and/or calcium and/or gallium, hydrocarbyl/hydride chain transfer agents.

The olefin monomer comprising a main group hydrocarbyl chain transfer agent used in the present invention has a structure according to Formula 1a:

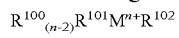

wherein: M is a main group metal; n is the oxidation state of M; $R^{100}$, $R^{101}$ and $R^{102}$ are each independently selected from the group consisting of a hydride, a C1-C18 hydrocarbyl group, or a hydrocarbyl group Q on the proviso that at least one of $R^{100}$, $R^{101}$ and $R^{102}$ is hydrocarbyl group Q. Wherein hydrocarbyl group Q is according to Formula 1b:

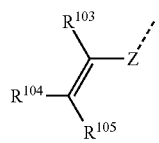

wherein Z is bonded to M and is a C1-C18 hydrocarbyl group; $R^{105}$ optionally forms a cyclic group with Z; wherein $R^{103}$ and $R^{104}$ and $R^{105}$ are each independently selected from hydrogen or hydrocarbyl;

In an embodiment, hydrocarbyl group Q is an α-olefin wherein Z is bonded to the main group metal, Z is a C1-C18 hydrocarbyl spacer group, $R^{103}$ $R^{104}$ and $R^{105}$ are each hydrogen, said hydrocarbyl group Q being according to Formula 1c:

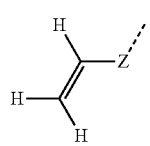

In an embodiment, hydrocarbyl group Q is an alkene wherein Z is bonded to the main group metal, Z is a C1-C18 hydrocarbyl spacer group, $R^{103}$ and $R^{104}$ are independently hydrogen or hydrocarbyl and R105 is a C1-18 hydrocarbyl, said $R^{105}$ group forming a cyclic structure with Z, said hydrocarbyl group Q being according to Formula 1d:

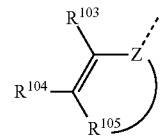

In an embodiment, said hydrocarbyl group Q can be an α-olefin according to Formula 1c or an unsaturated cyclic hydrocarbyl group according to Formula 1d. Preferably, hydrocarbyl group Q is an α-olefin or an unsaturated cyclic hydrocarbyl group.

Z is a branched or unbranched hydrocarbyl spacer group consisting of between 1 and 18 carbon atoms, preferably 2 and 8 carbon atoms, more preferably 4 and 7 carbon atoms, even more preferably 5 or 6 carbon atoms. Z is optionally substituted with hydrogen, carbon, heteroatoms or halides.

In an embodiment, hydrocarbyl group Q is an α-olefin according to Formula 1c. Said α-olefin has up to and including 30 carbon atoms, such as up to and including 20 carbon atoms, preferably up to and including 10 carbon atoms, such as ethenyl, propenyl, butenyl, heptenyl, hexenyl, septenyl, octenyl, nonenyl or decenyl and can be unbranched or branched.

In a preferred embodiment, said α-olefin is an unbranched α-olefin according to Formula 1e. In other words, the aluminum hydrocarbyl chain transfer agent comprises at least one hydrocarbyl chain bearing an α-olefin (i.e. hydrocarbyl group Q). Said hydrocarbyl group Q is an α-olefin-comprising a main group metal.

In a preferred embodiment, hydrocarbyl group Q is an α-olefin according to Formula 1e where n is 1-5. In other words, the hydrocarbyl group Q is 3-buten-1-yl, 4-penten-1-yl, 5-hexen-1-yl, 6-hepten-1-yl or 7-octen-1yl.

In an embodiment, the hydrocarbyl group Q is an unsaturated cyclic hydrocarbyl group according to Formula 1d. In said cyclic olefin the alkene is situated between substituents $R^{105}$ and Z and $R^{105}$ forms at least one a ring with Z. $R^{105}$ can be a C1-C18 hydrocarbyl, which forms one or more bonds with Z to form a cyclic group.

In a preferred embodiment hydrocarbyl group Q comprises a norbornene group. According to IUPAC numbering of norbornene groups (Formula 1f), $R^{105}$ provides carbons at positions 1, 6 and 7, Z provides carbons at positions 4 and 5, and the substituents at carbon 5. Suitable norbornene groups which can be used in the present invention can be, for example but not limited to, 5-ethylenebicyclo[2.2.1]hept-2-ene, 5-propylenebicyclo[2.2.1]hept-2-ene.

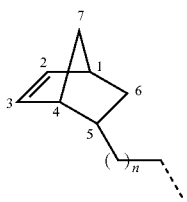

Formula If

The number of R groups around the main group metal is dependent on the oxidization state of the metal. For example, when the main group metal is zinc or magnesium or calcium, the oxidation state is +2, and the formula is $R^{100}MR^{101}$.

For example, when the main group metal is aluminum or boron or gallium, the oxidation state is +3, and the formula is $R^{100}R^{101}MR^{102}$.

In a preferred embodiment, at least one olefin comprising main group metal hydrocarbyl chain transfer agent can be for example ethyl(5-ethylene-2-norbornene) zinc, ethyl(7-octenl-yl) zinc, bis(5-ethylene-2-norbornene) zinc, or bis(7-octen-1-yl) zinc.

In a preferred embodiment, the olefin comprising at least one main group metal hydrocarbyl chain transfer agent can be for example bis(isobutyl)(5-ethylen-yl-2-norbornene) aluminum, di(isobutyl)(7-octen-1-yl) aluminum, di(isobutyl)(5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris(3-buten-1-yl) aluminum.

The copolymerization of at least one olefin comprising main group metal hydrocarbyl chain transfer agent and α-olefin monomer may be carried out in the presence of an additional and/or other chain transfer reagent. From the prior art chain transfer reactions are known using several different chain transfer agents.

Chain transfer to aluminum alkyls, zinc alkyls, and boron alkyls and boron hydrides as such has been reported. The present invention can use for example main group metal hydrocarbyls and/or main group metal hydrides as chain transfer agents.

As non-limiting examples of a main group metal hydrocarbyl or hydride the following can for example be used: one or more hydrocarbyl or hydride groups attached to a main group metal selected from aluminum, magnesium, calcium, zinc, gallium or boron. Of these several specific examples are specified below.

An additional chain transfer agent, which may be used in combination with at least one olefin monomer comprising main group metal hydrocarbyl chain transfer agent, may be selected from the group specified above having a general structure:

$R_{p-q}M(p)X_q$ wherein M is a main group metal, R is a hydride or hydrocarbyl group, p is the oxidation state of the metal, X is a heteroatom or heteroatom-bonded ligand, q is an integer between 0 and p−1. At least one hydrocarbyl or hydride group should be present. Preferably, at least one R group is alkyl.

When R is an alkyl this group has up to and including 30 carbon atoms, such as up to and including 20 carbon atoms, preferably up to and including 10 carbon atoms, such as for example methyl, ethyl, propyl, butyl, heptyl, hexyl, septyl, octyl, nonyl or decyl and can be unbranched or branched.

When R is an alkenyl this group has up to and including 30 carbon atoms, such as up to and including 20 carbon atoms, preferably up to and including 10 carbon atoms, such as ethenyl, propenyl, butenyl, heptenyl, hexenyl, septenyl, octenyl, nonenyl or decenyl and can be unbranched or branched.

When R is an alkynyl this group has up to and including 30 carbon atoms, such as up to and including 20 carbon atoms, preferably up to and including 10 carbon atoms, such as vinyl, propynyl, butynyl, heptynyl, hexynyl, septynyl, octynyl, nonynyl or decynyl and can be unbranched or branched.

When R is aryl it can be selected from mono cyclic or bicyclic groups or groups having more than two rings. These rings may be fused together or linked by a spacer. The aryl group might be substituted on any ring position with a hydrocarbyl or heteroatom-containing group. Examples of aryl moieties R include, but are not limited to, phenyl, 1-naphthyl, 2-naphthyl, dihydronaphthyl, tetrahydronaphthyl, biphenyl, anthryl, phenanthryl, biphenylenyl, acenaphthenyl, acenaphthylenyl, tolyl, xylyl, mesityl, 2-methoxy-phenyl, 2,6-dimethoxy-phenyl, 2-N,N-dimethylaminomethyl-phenyl, 2-N,N-dimethylamino-phenyl.

When R is an aryl-substituted alkyl this group consists of an alkyl containing an aryl that might be substituted on any ring position with a hydrocarbyl. Non-limiting examples are: benzyl, 1-phenylethyl, 2-phenylethyl, diphenylmethyl, 3-phenylpropyl, and 2-phenylpropyl, o-methoxy-phenyl-methyl, o-N,N-dimethylamino-phenyl-methyl.

In an embodiment main group metal hydrocarbyls containing hydrocarbyldiyl groups, e.g. cyclic or oligomeric main group metal hydrocarbyls or alkoxyhydrocarbyl or amidohydrocarbyl groups may be used in order to obtain telechelic polymer blocks, which can be used to prepare triblock copolymers. Examples of such cyclic or oligomeric chain transfer agents are $EtZn[CH_2CH(Et)(CH_2)_6CH(Et)CH_2Zn]_nEt$ (n=1, 2, 3, ... ), $iBu_2Al(CH_2)_6OAliBu_2$, $iBu_2Al(CH_2)_{20}OAliBu_2$, $Al[(CH_2)_{20}OAliBu_2]_3$, $iBu_2Al(CH_2)_{20}N(Me)AliBu_2$, $iBu_2Al(CH_2)_6N(Me)AliBu_2$, $Al[(CH_2)_{20}N(Me)AliBu_2]_3$ as exemplified in Makio et al. J. Am. Chem. SOC. 2013, (135), 8177-8180 and WO 2011/014533.

The heteroatom-containing ligand X of $R_{p-q}M(p)X_q$ can be selected for example from the group consisting of: halide, oxide (—O—), carboxylate (—$O_2CR^{40}$), alkoxide (—$OR^{40}$; i.e. O-alkyl), aryloxide (—OAr), thiolate (—$SR^{40}$), amide (—$NR^{40}R^{41}$), phosphide (—$PR^{40}R^{41}$), mercaptanate (—SAr), siloxide (—$OSiR^{40}R^{41}R^{42}$), stannate (—$OSnR^{40}R^{41}R^{42}$). Wherein $R^{40}$, $R^{41}$, $R^{42}$ are each independently a hydrocarbyl.

In an embodiment, an additional main group metal chain transfer agent may be selected from the group consisting of for example trialkyl boron, dialkyl boron halide, dialkyl boron hydride, diaryl boron hydride, dialkyl boron alkoxide, dialkyl boron aryloxide, dialkyl boron amide, dialkyl boron thiolate, dialkyl boron carboxylate, dialkyl boron phosphide, dialkyl boron mercaptanate, dialkyl boron siloxide, dialkyl boron stannate, alkyl boron dialkoxide, alkyl boron diaryloxide, alkyl boron dicarboxylate, alkyl boron diphosphide, alkyl boron dimercaptanate, alkyl boron disiloxide, alkyl boron distannate, boron hydride dialkoxide, boron hydride diaryloxide, boron hydride diamide, boron hydride dicarboxylate, boron hydride diphosphide, boron hydride dimercaptanate, boron hydride disiloxide, boron hydride distannate, trialkyl aluminum, dialkyl aluminum halide, dialkyl aluminum hydride, dialkyl aluminum alkoxide, dialkyl aluminum aryloxide, dialkyl aluminum amide, dialkyl aluminum thiolate, dialkyl aluminum carboxylate, dialkyl aluminum phosphide, dialkyl aluminum mercaptanate, dialkyl aluminum siloxane, dialkyl aluminum stannate, alkyl aluminum dialkoxide, alkyl aluminum diaryloxide, alkyl aluminum dicarboxylate, alkyl aluminum diphosphide, alkyl aluminum dimercaptanate, alkyl aluminum disiloxide, alkyl aluminum distannate, aluminum hydride dialkoxide, aluminum hydride diaryloxide, aluminum hydride diamide, aluminum hydride dicarboxylate, aluminum hydride diphosphide, aluminum hydride dimercaptanate, aluminum hydride disiloxide, aluminum hydride distannate, trialkyl gallium, dialkyl gallium halide, dialkyl gallium hydride, dialkyl gallium alkoxide, dialkyl gallium aryloxide, dialkyl gallium amide, dialkyl gallium thiolate, dialkyl gallium carboxylate, dialkyl gallium phosphide, dialkyl gallium mercaptanate, dialkyl gallium siloxane, dialkyl gallium stannate, dialkyl magnesium, diaryl magnesium, alkyl magnesium halide, alkyl magnesium hydride, alkyl magnesium alkoxide, alkyl magnesium aryloxide, alkyl magnesium amide, alkyl magnesium thiolate, alkyl magnesium carboxylate, alkyl magnesium phosphide, alkyl magnesium mercaptanate, alkyl magnesium siloxane, alkyl magnesium stannate, dialkyl calcium, alkyl calcium halide, alkyl calcium hydride, alkyl calcium alkoxide, alkyl calcium aryloxide, alkyl calcium amide, alkyl calcium thiolate, alkyl calcium carboxylate, alkyl calcium phosphide, alkyl calcium mercaptanate, alkyl calcium siloxane, alkyl calcium stannate, dialkyl zinc, alkyl zinc halide, alkyl zinc hydride, alkyl zinc alkoxide, alkyl zinc aryloxide, alkyl zinc amide, alkyl zinc thiolate, alkyl zinc carboxylate, alkyl zinc phosphide, alkyl zinc mercaptanate, alkyl zinc siloxane, alkyl zinc stannate, and or more combinations thereof, preferably trimethyl aluminum (TMA), triethyl aluminum (TEA), tri-isobutyl aluminum (TIBA), di(isobutyl) aluminum hydride (DIBALH), di(n-butyl) magnesium (DBM), n-butyl(ethyl)magnesium, benzyl calcium 2,6-di(t-butyl)-4-methyl-phenoxide, dimethyl zinc, diethyl zinc (DEZ), trimethyl gallium, triethyl gallium, tri-isobutyl gallium, triethylboron, 9-borabicyclo(3.3.1) nonane, catecholborane, and diborane and one or more combination thereof.

A main group metal, especially for example aluminum, hydrocarbyl can be used as an additional chain transfer agent and/or chain shuttling agent together with at least one olefin comprising at least one main group metal hydrocarbyl chain transfer agent functionalty or another main group metal, especially for example zinc, hydrocarbyl chain transfer agent. Using a combination of for example a magnesium hydrocarbyl and an aluminum hydrocarbyl as the chain transfer agents, a ternary system (TM+Al+Zn where TM is transition metal of the catalyst) is formed. Doing so can lead to reversible transfer reactions.

For example, hydrocarbyl zinc, hydrocarbyl gallium, hydrocarbyl boron or hydrocarbyl calcium can be used.

Catalyst System Suitable for Use in Step A)

A catalyst system for use in step a) comprises the following components:
i) a metal catalyst or metal catalyst precursor comprising a metal from Group 3-10 of the IUPAC Periodic Table of elements; and
ii) optionally a co-catalyst.
iii) optionally an additional chain transfer and/or chain shuttling agent;

Suitable chain transfer agents have been discussed above. Suitable catalysts and/or catalyst precursors are discussed in this section as well as suitable co-catalysts, which are optional. A catalyst for step A) can preferably be used for example without co-catalyst. On the other hand, a catalyst precursor for step A) can preferably be used with aa co-catalyst to obtain the actual active catalyst.

A catalyst for step A) can be used without co-catalyst, a catalyst precursor for step A) requires a co-catalyst to obtain the actual active catalyst.

Metal Catalyst and/or Catalyst Precursor Suitable for Step A)

In the section below several metal catalysts or metal catalyst precursors, which may be used to prepare the metal catalyst according to the present invention, are specified. Metal catalysts that are suitable for use in step A) of the present invention may be obtained by reaction the metal catalyst precursors with a co-catalyst either prior to use in step A) or by reaction in situ.

According to the present invention, the metal catalyst has a metal center selected from a Group 3 metal, a Group 4 metal, a Group 5 metal, a Group 6 metal, a Group 7 metal, a Group 8 metal, a Group 9 metal or a Group 10 metal, preferably Y, Sm, Ti, Zr, Hf, V, Cr, Fe, Co, Ni, Pd.

A metal catalyst or a metal catalyst precursor according to the invention may be for example a single-site catalyst or Ziegler-Natta catalyst.

Ziegler-Natta catalyst as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. Ziegler-Natta catalysts as reported in US2009/0048399, US2014/0350200, WO96/32427, WO01/23441, WO2007/134851, U.S. Pat. No. 4,978,648, EP1283 222A1, U.S. Pat. Nos. 5,556,820; 4,414,132; 5,106,806 and 5,077,357 may also be suitable to use as metal catalyst precursors in the present invention.

The metal catalysts or metal catalyst precursors may for example be a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethylsilyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

According to the invention, said catalyst precursor can be for example a so-called half-metallocene, or constrained geometry catalyst, even more preferably, $C_5Me_5[(C_6H_{11})_3P=N]TiCl_2$, $[Me_2Si(C_5Me_4)N(tBu)]TiCl_2$, $[C_5Me_4(CH_2CH_2NMe_2)]TiCl_2$. According to the invention, said catalyst can be for example a so-called post-metallocene, preferably $[Et_2NC(N(2,6-iPr_2—C_6H_3)]TiCl_3$ or [N-(2,6-di(I-methylethyl)phenyl)amido)(2-isopropylphenyl)(α-naphthalen-2-diyl(6-pyridin-2-diyl)methane)]hafnium dimethyl.

The metal catalyst or metal catalyst precursor can also be for example a preferably $C_s$ or $C_1$ symmetric compound according to the formula $(C_5R^8{}_4)R^9(C_{13}R^8{}_8)ML^1{}_n$, where $C_5R^8{}_4$ is an unsubstituted or substituted cyclopentadienyl, and $C_{13}R^{11}{}_8$ is an unsubstituted fluorenyl group or a substituted fluorenyl group; and the bridging $R^9$ group is selected from the group consisting of —Si(Me)$_2$-, —Si(Ph)$_2$-, —C(Me)$_2$- or —C(Ph)$_2$-, thus producing C$_1$- and C$_s$-symmetric metallocenes.

Non-limiting examples of zirconocene dichloride metal catalyst precursors suitable for use in the present invention include: bis(cyclopentadienyl) zirconium dichloride, bis(methyl-cyclopentadienyl) zirconium dichloride, bis(n-propyl-cyclopentadienyl) zirconium dichloride, bis(n-butyl-cyclopentadienyl) zirconium dichloride, bis(1,3-dimethyl-cyclopentadienyl) zirconium dichloride, bis(1,3-di-t-butyl-cyclopentadienyl) zirconium dichloride, bis(1,3-ditrimethylsilyl-cyclopentadienyl) zirconium dichloride, bis(1,2,4-trimethyl-cyclopentadienyl) zirconium dichloride, bis(1,2,3,4-tetramethyl-cyclopentadienyl) zirconium dichloride, bis(pentamethylcyclopentadienyl) zirconium dichloride, bis(indenyl) zirconium dichloride, bis(2-phenyl-indenyl) zirconium dichloride, bis(fluorenyl) zirconium dichloride, bis(tetrahydrofluorenyl) zirconium dichloride, dimethylsilyl-bis(cyclopentadienyl) zirconium dichloride, dimethylsilyl-bis(3-t-butyl-cyclopentadienyl) zirconium dichloride, dimethylsilyl-bis(3-trimethylsilyl-cyclopentadienyl) zirconium dichloride, dimethylsilyl-bis(tetrahydrofluorenyl) zirconium dichloride, dimethylsilyl-(1-indenyl)(cyclopentadienyl) zirconium dichloride, dimethylsilyl-(1-indenyl)(fluorenyl) zirconium dichloride, dimethylsilyl-(1-indenyl)(octahydrofluorenyl) zirconium dichloride, rac-dimethylsilyl-bis(2-methyl-3-t-butyl-cyclopentadienyl) zirconium dichloride, rac-dimethylsilyl-bis(1-indenyl) zirconium dichloride, rac-dimethylsilyl-bis(4,5,6,7-tetrahydro-1-indenyl) zirconium dichloride, rac-dimethylsilyl-bis(2-methyl-1-indenyl) zirconium dichloride, rac-dimethylsilyl-bis(4-phenyl-1-indenyl) zirconium dichloride, rac-dimethylsilyl-bis(2-methyl-4-phenyl-1-indenyl) zirconium dichloride, rac-ethylene-bis(1-indenyl) zirconium dichloride, rac-ethylene-bis(4,5,6,7-tetrahydro-1-indenyl) zirconium dichloride, rac-1,1,2,2-tetramethylsilanylene-bis(1-indenyl) zirconium dichloride, rac-1,1,2,2-tetramethylsilanylene-bis(4,5,6,7-tetrahydro-1-indenyl) zirconium dichloride, rac-ethylidene(1-indenyl)(2,3,4,5-tetramethyl-1-cyclopentadienyl) zirconium dichloride, rac-[1-(9-fluorenyl)-2-(2-methylbenzo[b]indeno[4,5-d]thiophen-1-yl)ethane]zirconium dichloride, dimethylsilyl bis(cyclopenta-phenanthren-3-ylidene) zirconium dichloride, dimethylsilyl bis(cyclopenta-phenanthren-1-ylidene) zirconium dichloride, dimethylsilyl bis(2-methyl-cyclopenta-phenanthren-1-ylidene) zirconium dichloride, dimethylsilyl bis(2-methyl-3-benz-inden-3-ylidene) zirconium dichloride, dimethylsilyl-bis[(3a,4,5,6,6a)-2,5-dimethyl-3-(2-methyl-phenyl)-6H-cyclopentathien-6-ylidene] zirconium dichloride, dimethylsilyl-(2,5-dimethyl-1-phenylcyclopenta[b]pyrrol-4(1H)-ylidene)(2-methyl-4-phenyl-1-indenyl) zirconium dichloride, bis(2-methyl-1-cyclopenta-phenanthren-1-yl)zirconium dichloride, [ortho-bis(4-phenyl-2-indenyl) benzene]zirconium dichloride, [ortho-bis(5-phenyl-2-indenyl) benzene] zirconium dichloride, [ortho-bis(2-indenyl)benzene] zirconium dichloride, [ortho-bis(1-methyl-2-indenyl)benzene]zirconium dichloride, [2,2'-(1,2-phenyldiyl)-1,1'dimethylsilyl-bis(indenyl)] zirconium dichloride, [2,2'-(1,2-phenyldiyl)-1,1'-(1,2-ethanediyl)-bis(indenyl)] zirconium dichloride, dimethylsilyl-(cyclopentadienyl)(9-fluorenyl) zirconium dichloride, diphenylsilyl-(cyclopentadienyl)(fluorenyl) zirconium dichloride, dimethylmethylene-(cyclopentadienyl)(fluorenyl) zirconium dichloride, diphenylmethylene-(cyclopentadienyl)(fluorenyl) zirconium dichloride, dimethylmethylene-(cyclopentadienyl)(octahydrofluorenyl) zirconium dichloride, diphenylmethylene-(cyclopentadienyl)(octahydrofluorenyl) zirconium dichloride, dimethylmethylene-(cyclopentadienyl)(2,7-di-t-butyl-fluorenyl) zirconium dichloride, diphenylmethylene-(cyclopentadienyl)(2,7-di-t-butyl-fluorenyl) zirconium dichloride, dimethylmethylene-(3-methyl-1-cyclopentadienyl)(fluorenyl) zirconium dichloride, diphenylmethylene-(3-methyl-1(3-cyclopentadienyl)(fluorenyl) zirconium dichloride, dimethylmethylene-(3-cyclohexyl-1-cyclopentadienyl)(fluorenyl) zirconium dichloride, diphenylmethylene-(3-cyclohexyl-1-cyclopentadienyl)(fluorenyl) zirconium dichloride, dimethylmethylene-(3-t-butyl-1-cyclopentadienyl)(fluorenyl) zirconium dichloride, diphenylmethylene-(3-t-butyl-1-cyclopentadienyl)(fluorenyl) zirconium dichloride, dimethylmethylene-(3-ademantyl-1-cyclopentadienyl)(fluorenyl) zirconium dichloride, diphenylmethylene-(3-ademantyl-1-cyclopentadienyl)(fluorenyl) zirconium dichloride, dimethylmethylene-(3-methyl-1-cyclopentadienyl)(2,7-di-t-butyl-fluorenyl) zirconium dichoride, diphenylmethylene-(3-methyl-1-cyclopentadienyl)(2,7-di-t-butyl-fluorenyl) zirconium dichloride, dimethylmethylene-(3-cyclohexyl-1-cyclopentadienyl)(2,7-di-t-butyl-fluorenyl) zirconium dichloride, diphenylmethylene-(3-cyclohexyl-1-cyclopentadienyl)(2,7-di-t-butyl-fluorenyl) zirconium dichloloride, dimethylmethylene-(3-t-butyl-1-cyclopentadienyl)(2,7-di-t-butyl-fluorenyl)zirconium dichloride, diphenylmethylene-(3-t-butyl-1-cyclopentadienyl)(2,7-di-t-butyl-fluorenyl) zirconium dichloride, dimethylmethylene-(3-methyl-cyclopentadienyl)(octahydro-octamethyl-dibenzo-fluorenyl) zirconium dichloride, diphenylmethylene-(3-methyl-cyclopentadienyl)(octahydro-octamethyl-dibenzo-fluorenyl) zirconium dichloride, dimethylmethylene-(3-cyclohexyl-cyclopentadienyl)(octahydro-octamethyl-dibenzo-fluorenyl) zirconium dichloride, diphenylmethylene-(3-cyclohexyl-cyclopentadienyl)(octahydro-octamethyl-dibenzo-fluorenyl) zirconium dichloride, dimethylmethylene-(3-t-butyl-cyclopentadienyl)(octahydro-octamethyl-dibenzo-fluorenyl) zirconium dichloride, diphenylmethylene-(3-t-butyl-cyclopentadienyl)(octahydro-octamethyl-dibenzo-fluorenyl) zirconium dichloride, dimethylmethylene-(3-ademantyl-cyclopentadienyl)(octahydro-octamethyl-dibenzo-fluorenyl) zirconium dichloride, diphenylmethylene-(3-ademantyl-cyclopentadienyl)(octahydro-octamethyl-dibenzo-fluorenyl) zirconium dichloride.

In a preferred embodiment, the metal catalyst or metal catalyst precursor can be for example: [[2,2'-[[[2-(dimethylamino-κN)ethyl]imino-κN]bis(methylene)]bis[4,6-bis(1,1-dimethylethyl) phenolato-κO]] zirconium dibenzyl, (phenylmethyl)[[2,2'-[(propylimino-κN)bis(methylene)]bis[4,6-bis(1,1-dimethylethyl)phenolato-κO]] zirconium dibenzyl or (phenylmethyl)[[2,2'-[[[(2-pyridinyl-κN)methyl]imino-κN]bis(methylene)]bis[4,6-bis(1,1-dimethylethyl)phenolato-κO]] zirconium dibenzyl.

In a preferred embodiment, complexes as reported in WO 00/43426, WO 2004/081064, US 2014/0039138 A1, US 2014/0039139 A1 and US 2014/0039140 A1 are suitable to use as metal catalyst precursors for the processes of the present invention.

Compounds analogous to those listed above but where Zr has been replaced by Hf, so called hafnocenes, may also be used according to the as catalyst precursors present invention.

The metal catalysts or metal catalyst precursors for use in the present invention may also be from post-metallocene catalysts or catalyst precursors.

In a preferred embodiment, the metal catalyst or metal catalyst precursor may be: [HN(CH2CH2N-2,4,6-Me3-C6H2)2]Hf(CH2Ph)2 or bis[N,N'-(2,4,6-trimethylphenyl)amido)ethylenediamine]hafnium dibenzyl.

In a another preferred embodiment, the metal catalyst or metal catalyst precursor may be 2,6-diisopropylphenyl-N-(2-methyl-3-(octylimino)butan-2) hafnium trimethyl, 2,4,6-trimethylphenyl-N-(2-methyl-3-(octylimino)butan-2) hafnium trimethyl.

In a preferred embodiment, the metal catalyst or metal catalyst precursor may be [2,6-iPr2C6H3NC(2-iPr-C6H4)-2-(6-C5H6)]HfMe2-[N-(2,6-di(1-methylethyl)phenyl) amido)(2-isopropylphenyl) (-naphthalen-2-diyl(6-pyridin-2-diyl)methane)]hafnium dimethyl.

Other non-limiting examples of metal catalyst precursors according to the present invention are: [N-(2,6-di(1-methylethyl)phenyl)amido)(o-tolyl)(α-naphthalen-2-diyl(6-pyridin-2-diyl)methane)] hafnium dimethyl, [N-(2,6-di(1-methylethyl)phenyl)amido)(o-tolyl)(α,α-naphthalen-2-diyl(6-pyridin-2-diyl)methane)] hafnium di(N,N-dimethylamido), [N-(2,6-di(l-methylethyl)phenyl)amido)(o-tolyl)(α,α-naphthalen-2-diyl(6-pyridin-2-diyl)methane)] hafnium dichloride, [N-(2,6-di(1-methylethyl)phenyl) amido)(phenanthren-5-yl)(α,α-naphthalen-2-diyl (6-pyridin-2-diyl)methane)] hafnium dimethyl, [N-(2,6-di (1-methylethyl)phenyl)amido)(phenanthren-5-yl)(α-naphthalen-2-diyl(6-pyridin 2-diyl)methane)] hafnium di(N,N-dimethylamido), [N-(2,6-di(l-methylethyl)phenyl)amido) (phenanthren-5-yl) (α-naphthalen-2-diyl(6-pyridin-2-diyl) methane)] hafnium dichloride. Other non-limiting examples include the family of pyridyl diamide metal dichloride complexes such as: [N-[2,6-bis(1-methylethyl)phenyl]-6-[2-[phenyl(phenylamino-κN)methyl]phenyl]-2-pyridinemethanaminato(2-)-κN1,κN2]hafnium dichloride, [N-[2,6-bis(1-methylethyl)phenyl]-6-[2-[(phenylamino-κN)methyl]-1-naphthalenyl]-2-pyridinemethanaminato(2-)-κN1,κN2] hafnium dichloride, [N-[2,6-bis(1-methylethyl)phenyl]-α-[2-(1-methylethyl)phenyl]-6-[2-[(phenylamino-κN)methyl]phenyl]-2-pyridinemethanaminato(2-)-κN1,κN2] hafnium dichloride, [N-(2,6-diethylphenyl)-6-[2-[phenyl(phenylamino-κN)methyl]-1-naphthalenyl]-2-pyridinemethanaminato(2-)-κN1, κN2]zirconium dichloride, [4-methyl-2-[[2-phenyl-1-(2-pyridinyl-κN)ethyl]amino-κN]phenolato (2-)-κO]bis(phenylmethyl)hafnium bis(phenylmethyl), [2-(1,1-dimethylethyl)-4-methyl-6-[[2-phenyl-1-(2-pyridinyl-κN)ethyl]amino-κN]phenolato(2-)-κO] hafnium bis(phenylmethyl), [2-(1,1-dimethylethyl)-4-methyl-6-[[phenyl(2-pyridinyl-κN)methyl]amino-κN]phenolato(2-)-κO]hafnium bis(phenylmethyl).

Non-limiting examples of titanium dichloride metal catalyst precursors suitable for use in the present invention include: cyclopentadienyl(P,P,P-tri-t-butylphosphine imidato) titanium dichloride, pentafluorophenylcyclopentadienyl(P,P,P-tri-t-butylphosphine imidato) titanium dichloride, pentamethylcyclopentadienyl(P,P,P-tri-t-butylphosphine imidato) titanium dichloride, 1,2,3,4-tetraphenyl-cyclopentadienyl(P,P,P-tri-t-butylphosphine imidato) titanium dichloride, cyclopentadienyl(P,P,P-tricyclohexylphosphine imidato) titanium dichloride, pentafluorophenyl cyclopentadienyl(P,P,P-tricyclohexylphosphine imidato) titanium dichloride, pentamethylcyclopentadienyl(P,P,P-tricyclohexylphosphine imidato) titanium dichloride, 1,2,3,4-tetraphenyl-cyclopentadienyl(P,P,P-tricyclohexylphosphine imidato) titanium dichloride, pentamethylcyclopentadienyl (P,P-dicyclohexyl-P-(phenylmethyl)phosphine imidato) titanium dichloride, cyclopentadienyl(2,6-di-t-butyl-4-methylphenoxy) titanium dichloride, pentafluorophenylcyclopentadienyl(2,6-di-t-butyl-4-methylphenoxy) titanium dichloride, pentamethylcyclopentadienyl(2,6-di-t-butyl-4-methylphenoxy) titanium dichloride, 1,2,3-trimethyl-cyclopentadienyl(2,6-bis(1-methylethyl) phenolato) titanium dichloride, [(3a,4,5,6,6a-η)-2,3,4,5,6-pentamethyl-3aH-cyclopenta[b]thien-3a-yl](2,6-bis(1-methylethyl)phenolato) titanium dichloride, pentamethylcyclopentadienyl(N,N'-bis(1-methylethyl)ethanimidamidato) titanium dichloride, pentamethylcyclopentadienyl(N,N'-dicyclohexylbenzenecarboximidamidato) titanium dichloride, pentamethylcyclopentadienyl(N,N'-bis(1-methylethyl)benzenecarboximidamidato) titanium dichloride, cyclopentadienyl(1,3-bis(1,1-dimethylethyl)-2-imidazolidiniminato) titanium dichloride, cyclopentadienyl (1,3-dicyclohexyl-2-imidazolidiniminato) titanium dichloride, cyclopentadienyl(1,3-bis[2,6-bis(1-methylethyl) phenyl]-2-imidazolidiniminato) titanium dichloride, pentafluorophenylcyclopentadienyl(1,3-bis(1,1-dimethylethyl)-2-imidazolidiniminato) titanium dichloride, pentafluorophenylcyclopentadienyl(1,3-dicyclohexyl-2-imidazolidiniminato) titanium dichloride, pentafluorophenylcyclopentadienyl(1,3-bis[2,6-bis(1-methylethyl)phenyl]-2-imidazolidiniminato) titanium dichloride, pentamethylcyclopentadienyl(di-t-butylketimino) titanium dichloride, pentamethylcyclopentadienyl(2,2,4,4-tetramethyl-3-pentaniminato) titanium dichloride, [(3a,4,5,6,6a-η)-2,4,5,6-tetramethyl-3aH-cyclopenta [b]thien-3a-yl](2,2,4,4-tetramethyl-3-pentaniminato) titanium dichloride, cyclopentadienyl(N,N-bis(1-methylethyl)benzenecarboximidamidato) titanium dichloride, pentafluorophenylcyclopentadienyl(N,N-bis(1-methylethyl) benzenecarboximidamidato) titanium dichloride, pentamethylcyclopentadienyl(N,N-bis(1-methylethyl)benzenecarboximidamidato) titanium dichloride, cyclopentadienyl(2,6-difluoro-N,N-bis(1-methylethyl)benzenecarboximidamidato) titanium dichloride, pentafluorophenylcyclopentadienyl(2,6-difluoro-N,N-bis(1-methylethyl)benzenecarboximidamidato) titanium dichloride, pentamethylcyclopentadienyl(2,6-difluoro-N,N-bis(1-methylethyl)benzenecarboximidamidato) titanium dichloride, cyclopentadienyl(N,N-dicyclohexyl-2,6-difluorobenzenecarboximidamidato) titanium dichloride, pentafluorophenylcyclopentadienyl(N,N-dicyclohexyl-2,6-difluorobenzenecarboximidamidato) titanium dichloride, pentamethylcyclopentadienyl(N,N-dicyclohexyl-2,6-difluorobenzenecarboximidamidato) titanium dichloride, cyclopentadienyl(N,N,N',N'-tetramethylguanidinato) titanium dichloride, pentafluorophenylcyclopentadienyl(N,N,N',N'-tetramethylguanidinato) titanium dichloride, pentamethylcyclopentadienyl(N,N,N',N'-tetramethylguanidinato) titanium dichloride, pentamethylcyclopentadienyl(1-(imino) phenylmethyl)piperidinato) titanium dichloride, pentamethylcyclopentadienyl chromium dichloride tetrahydrofuran complex.

Non-limiting examples of titanium (IV) dichloride metal catalyst suitable for use in the present invention are: (N-t-butylamido)(dimethyl)(tetramethylcyclopentadienyl)silane titanium dichloride, (N phenylamido)(dimethyl)(tetramethylcyclopentadienyl) silane titanium dichloride, (N sec-butylamido)(dimethyl)(tetramethylcyclopentadienyl)silane titanium dichloride, (N sec-dodecylamido) (dimethyl) (fluorenyl)silane titanium dichloride, (3 phenylcyclopentadien-1-yl)dimethyl(t-butylamido) silane titanium dichloride, (3 (pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3 (3-N,N-dimethylamino)phenyl) cyclopentadien-1-yl)dimethyl(t-butylamido) silane titanium dichloride, (P-t-butylphospho)(dimethyl) (tetramethylcyclopentadienyl) silane titanium dichloride. Other examples are the metal catalyst precursor cited in the list directly above wherein Ln is dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl.

Suitable metal catalyst precursors can be also the trivalent transition metal as those described in WO 9319104 (for example see especially example 1, page 13, line 15).

Suitable metal catalyst precursors can be also the trivalent transition metal as [C5Me4CH2CH2N(n-Bu)2]TiCl2 described in WO 9613529 (for example see especially example Ill, page 20, line 10-13) or [C5H(iPr)3CH2CH2NMe2]TiCl2 described in WO 97142232 and WO 9742236 (for example see especially example 1, page 26, line 14).

In an embodiment, the metal catalyst precursor is [C5H4CH2CH2NMe2]TiCl2; In an embodiment, the metal catalyst or metal catalyst precursor may also be [C5Me4CH2CH2NMe2]TiCl2, [C5H4CH2CH2NiPr2]TiCl2, [C5Me4CH2CH2NiPr2]TiCl2, [C5H4C9H6N]TiCl2, [C5H4CH2CH2NMe2]CrCl2, [C5Me4CH2CH2NMe2]CrCl2; [C5H4CH2CH2NiPr2]CrCl2, [C5Me4CH2CH2NiPr2]CrCl2 or [C5H4C9H6N]CrCl2.

A non-limiting list of examples of metal catalyst precursors that would be suitable according to the present invention are: (N,N dimethylamino)methyl-tetramethylcyclopentadienyl titanium dichloride, (N,N dimethylamino)ethyl-tetramethylcyclopentadienyl titanium dichloride, (N,N dimethylamino)propyl-tetramethylcyclopentadienyl titanium dichloride, (N,N dibutylamino)ethyl-tetramethylcyclopentadienyl titanium dichloride, (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenyl-phosphino)ethyl-tetramethylcyclopentadienyl titanium dichloride, (diphenylphosphino)methyldimethylsilyl-tetramethylcyclopentadienyl titanium dichloride. Other examples are the catalysts cited in the list directly above wherein Ln wherein the chloride can be replaced with bromide, hydride, methyl, benzyl, phenyl, allyl, (2-N,N-dimethylaminomethyl)phenyl, (2-N,N-dimethylamino)benzyl, 2,6-dimethoxyphenyl, pentafluorophenyl, and/or wherein the metal is trivalent titanium or trivalent chromium.

In a preferred embodiment, the catalyst precursor is: [2-(2,4,6-iPr3-C6H2)-6-(2,4,6-iPr3-C6H2)-C5H3N]Ti(CH2Ph)3 or [Et2NC(N-2,6-iPr2-C6H3)2]TiCl3

Other non-limiting examples of metal catalyst precursors according to the present invention are: {N',N"-bis[2,6-di(1-methylethyl)phenyl]-N,N-diethylguanidinato} titanium trichloride, {N',N"bis[2,6-di(1-methylethyl)phenyl]-N-methyl-N-cyclohexylguanidinato} titanium trichloride, {N', N"-bis[2,6-di(1-methylethyl)phenyl]-N,N-pentamethyleneguanidinato}titanium trichloride, {N',N"-bis[2,6-di(methyl)phenyl]-sec-butyl-aminidinato} titanium trichloride, {N-trimethylsilyl,N'—(N',N'-dimethylaminomethyl)benzamidinato} titanium dichloride THF complex, {N-trimethylsilyl,N'—(N",N"-dimethylaminomethyl) benzamidinato}vanadium dichloride THF complex, {N,N'-bis(trimethylsilyl)benzamidinato} titanium dichloride THF complex, {N,N'-bis(trimethylsilyl)benzamidinato} vanadium dichloride THF complex.

In a preferred embodiment, the catalyst precursor can be for example [C5H3N{CMe=N(2,6-iPr2C6H3)}2]FeCl2, [2,4-(t-Bu)2,-6-(CH=NC6F5)C6H2O]2TiCl2 or bis[2-(1,1-dimethylethyl)-6-[(pentafluorophenylimino)methyl] phenolato] titanium dichloride. Other non-limiting examples of metal catalyst precursors according to the present invention can be for example: bis[2-[(2-pyridinylimino)methyl]phenolato] titanium dichloride, bis[2-(1,1-dimethylethyl)-6-[(phenylimino)methyl]phenolato] titanium dichloride, bis [2-(1,1-dimethylethyl)-6-[(1-naphthalenylimino)methyl] phenolato] titanium dichloride, bis[3-[(phenylimino)methyl][1,1'-biphenyl]-2-phenolato] titanium dichloride, bis [2-(1,1-dimethylethyl)-4-methoxy-6-[(phenylimino)methyl] phenolato] titanium dichloride, bis[2,4-bis(1-methyl-1-phenylethyl)-6-[(phenylimino)methyl]phenolato] titanium dichloride, bis[2,4-bis(1,1-dimethylpropyl)-6-[(phenylimino)methyl]phenolato] titanium dichloride, bis[3-(1,1-dimethylethyl)-5-[(phenylimino)methyl][1,1'-biphenyl]-4-phenolato] titanium dichloride, bis[2-[(cyclohexylimino)methyl]-6-(1,1-dimethylethyl)phenolato] titanium dichloride, bis[2-(1,1-dimethylethyl)-6-[[[2-(1-methylethyl)phenyl]imino]methyl]phenolato] titanium dichloride, bis[2-(1,1-dimethylethyl)-6-[(pentafluorophenylimino)ethyl]phenolato] titanium dichloride, bis[2-(1,1-dimethylethyl)-6-[(pentafluorophenylimino)propyl]phenolato] titanium dichloride, bis[2,4-bis(1,1-dimethylethyl)-6-[1-(phenylimino)ethyl]phenolato] titanium dichloride, bis[2,4-bis(1,1-dimethylethyl)-6-[1-(phenylimino)propyl]phenolato] titanium dichloride, bis[2,4-bis(1,1-dimethylethyl)-6-[phenyl(phenylimino)methyl]phenolato] titanium dichloride. Other examples are the metal catalyst precursor cited in the list directly above wherein the dichloride can be replaced with dimethyl, dibenzyl, diphenyl, 1,4-diphenyl-2-butene-1, 4-diyl, 1,4-dimethyl-2-butene-1,4-diyl or 2,3-dimethyl-2-butene-1,4-diyl; and/or wherein the metal may be zirconium or hafnium.

In a preferred embodiment, the catalyst precursor can be: [2-[[[2-[[[3,5-bis(1,1-dimethylethyl)-2-(hydroxy-κO)phenyl]methyl]amino-κN]ethyl]methylamino-κN]methyl]-4,6-bis(1,1-dimethylethyl)phenolato(2-)-κO] titanium bis(phenylmethyl), [2,4-dichloro-6-[[[2-[[[3,5-dichloro-2-(hydroxy-κO)phenyl]methyl]amino-κN]ethyl]methylamino-κN]methyl]phenolato(2-)-κO] titanium bis (phenylmethyl), [2-[[[[1-[[2-(hydroxy-κO)-3,5-diiodophenyl]methyl]-2-pyrrolidinyl-κN]methyl]amino-κN]methyl]-4-methyl-6-tricyclo[3.3.1.13,7]dec-1-ylphenolato(2-)-κO] titanium bis(phenylmethyl), [2-[[[2-[[[[2-(hydroxy-κO)-3,5-bis(1-methyl-1-phenylethyl) phenyl]methyl]methylamino-κN]methyl]phenyl] methylamino-κN]methyl]-4,6-bis(1-methyl-1-phenylethyl) phenolato(2-)-κO] titanium bis(phenylmethyl), [2,4-dichloro-6-[[[2-[[[3,5-dichloro-2-(hydroxy-KO)phenyl] methyl]amino-κN]methyl]phenyl]amino-κN]methyl] phenolato(2-)-κO] titanium bis(phenylmethyl). Other examples are the metal catalyst precursor cited in the list directly above wherein bis(phenylmethyl) can be replaced with dichloride, dimethyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

A non-limiting list of examples of chromium catalysts that would be suitable for use in to the present invention are: (N-t-butylamido)(dimethyl)(tetramethylcyclopentadienyl) silane chromium bis(trimethylsilyl)methyl, (N-phenylamido)(dimethyl)(tetramethylcyclopentadienyl) silane chromium bis(trimethyl)methyl, (N-sec-butylamido)(dimethyl) (tetramethylcyclopentadienyl)silane chromium bis(t-rimethylsilyl)methyl, (N-sec-dodecylamido)(dimethyl) (fluorenyl)silane chromium hydride triphenylphosphine, (P-t-butylphospho)(dimethyl)(tetramethylcyclopentadienyl) silane chromium bis(trimethylsilyl)methyl. Other examples are the catalysts cited in the list directly above wherein L1 is hydride, methyl, benzyl, phenyl, allyl, (2-N,N-dimethylaminomethyl)phenyl, (2-N,N-dimethylamino)benzyl; in other words chromium methyl, chromium benzyl, chromium allyl, chromium (2-N,N-dimethylamino)benzyl; and/or wherein the metal is trivalent yttrium or samarium; Other examples are metal catalyst precursors as cited in the list directly above wherein Ln is chloride, bromide, hydride, methyl, benzyl, phenyl, allyl, (2-N,N-dimethylaminomethyl)phenyl, (2-N,N-dimethylamino)benzyl and/or wherein the metal is trivalent titanium or trivalent chromium.

Non-limiting examples of metal catalyst precursors according to the present invention are: N,N'-1,2-acenaphthylenediylidenebis(2,6-bis(1-methylethyl)benzenamine) nickel dibromide, N,N'-1,2-ethanediylidenebis(2,6-dimethylbenzenamine) nickel dibromide, N,N'-1,2-ethanediylidenebis(2,6-bis(1-methyl-ethyl)benzenamine) nickel dibromide, N,N'-1,2-acenaphthylenediylidenebis(2,6-dimethylbenzenamine) nickel dibromide, N,N'-1,2-acenaphthylenediylidenebis(2,6-bis(1-methylethyl)benzenamine) nickel dibromide, N,N'-1,2-acenaphthylenediylidenebis(1,1'-biphenyl)-2-amine nickel dibromide. Other examples 330 are the catalysts cited in the list directly above wherein bromide can be replaced with chloride, hydride, methyl, benzyl and/or the metal can be palladium.

Further non-limiting examples of metal catalyst precursors according to the present invention are: [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]-6-(1,1-dimethylethyl)phenolato-κO] nickel phenyl (triphenylphosphine), [2-[[[2,6-bis(1-methylethyl)phenyl]imino-κN]methyl]phenolato-κO] nickel phenyl (triphenylphosphine)-, [3-[[[2,6-bis(1-methylethyl)phenyl]imino-κN]methyl][1,1'-biphenyl]-2-olato-κO] nickel phenyl (triphenylphosphine)-, [2-[[[2,6-bis(1-methylethyl)phenyl]imino-κN]methyl]-4-methoxyphenolato-κO] nickel phenyl (triphenylphosphine), [2-[[[2,6-bis(1-methylethyl)phenyl]imino-κN]methyl]-4-nitrophenolato-κO] nickel phenyl (triphenylphosphine), [2,4-diiodo-6-[[[3,3",5,5"-tetrakis(trifluoromethyl)[1,1':3',1"-terphenyl]-2'-yl]imino-κN]methyl]phenolato-κO] nickel methyl[[3,3',3"-(phosphinidyne-κP)tris[benzenesulfonato]]] trisodium; [2,4-diiodo-6-[[[3,3",5,5"-tetrakis(trifluoromethyl)[1,1':3',1"-terphenyl]-2'-yl]imino-κN]methyl]phenolato-κO] nickel methyl[[3,3'-(phenylphosphinidene-κP)bis[benzenesulfonato]]]-disodium.

Co-Catalysts Suitable for Step A)

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. B(R')$_y$ wherein R' is a fluorinated aryl and y is 3 or 4, respectively). Examples of a fluorinated borane is B($C_6F_5$)$_3$ and of fluorinated borates are [X]$^+$[B($C_6F_5$)$_4$]$^-$ (e.g. X=Ph$_3$C, $C_6H_5$N(H)Me$_2$).

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula (Al(CH$_3$)$_{3-n}$O$_{0.5n}$)$_x$·(AlMe$_3$)$_y$ having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, (100), 1391. Suitable alkylating agents are trialkyl aluminum compounds, preferably TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type [C]⁺[A]⁻ where "C" is a cationic group such as ammonium, phosphonium, oxonium, silylium or sulfonium groups and [A]⁻ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Scavengers Suitable for Step A)

A scavenger can optionally be added in the catalyst system in order to react with impurities that are present in the polymerization reactor, and/or in the solvent and/or monomer feed. This scavenger can prevent poisoning of the catalyst during the olefin polymerization process. The scavenger can be the same as the co-catalyst but can also independently be selected from the group consisting for example of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Step A) is preferably carried out in an inert atmosphere. Step A) can be preferably for example carried out using chain transfer polymerization.

Copolymerization of an Olefin and an Olefin Comprising a Chain Transfer Agent Functionality Step A) is preferably carried out in an inert atmosphere. Step A) can be preferably for example carried out using chain transfer polymerization.

Copolymerization of the olefins can for example be carried out in the gas phase below the melting point of the polymer. Copolymerization can also be carried out in the slurry phase below the melting point of the polymer. Moreover, copolymerization can be carried out in solution at temperatures above the melting point of the polymer product.

It is known to continuously polymerize one or more olefins, such as ethylene or propylene, in solution or in slurry, e.g. in a continuous (multi) CSTR or (multi) loop reactor, in the gas-phase in a reactor with a fluidized or mechanically stirred bed or in a combination of these different reactors, in the presence of a catalyst based on a compound of a transition metal belonging to Groups 3 to 10 of the Periodic Table of the Elements.

For the gas phase process, the polymer particles are kept in the fluidized and/or stirred state in a gaseous reaction mixture containing the olefin(s). The catalyst is introduced continuously or intermittently into the reactor while the polymer constituting the fluidized or mechanically stirred bed is withdrawn from the reactor, also continuously or intermittently. The heat of the polymerization reaction is essentially removed by the gaseous reaction mixture, which passes through heat transfer means before being recycled into the reactor. In addition, a liquid stream may be introduced into the gas-phase reactor to enhance heat removal.

Slurry phase polymerization of olefins is very well known, wherein an olefin monomer and optionally olefin comonomer are polymerized in the presence of a catalyst in a diluent in which the solid polymer product is suspended and transported. Two or more reactors are typically used in such polymerizations when it is desired to produce a multimodal product, in which a polymer made in a first reactor is transferred to a second reactor, where a second polymer having different properties to the first polymer is made in the presence of the first. However it may also be desirable to connect two reactors making monomodal polymers in order to create a swing monomodal/multimodal plant or to increase the flexibility of two small reactors that individually may lack the scale to be economically viable. A slurry reactor may also be combined with a gas phase reactor.

Slurry phase polymerizations are typically carried out at temperatures in the range 50-125° C. and at pressures in the range 1-40 bar. The catalyst used can be any catalyst typically used for olefin polymerization such as those according to the present invention. The product slurry, comprising polymer and diluent and in most cases also components of the catalyst system, olefin monomer and comonomer can be discharged from each reactor intermittently or continuously, optionally using concentrating devices such as hydrocyclones or settling legs to minimize the quantity of fluids withdrawn with the polymer.

The present invention may also be carried out in a solution polymerization process. Typically, in the solution process, the monomer and polymer are dissolved in an inert solvent.

Solution polymerization has some advantages over slurry processes. The molecular weight distribution and the process variables are more easily controlled because the polymerization occurs in a homogeneous phase using homogeneous single site catalysts. The high polymerization temperature typically above 150° C. also leads to high reaction rates. The solution process is used primarily for the production of relatively low molecular weight and/or low density resins, which are difficult to manufacture by the liquid slurry or gas phase processes. The solution process is very well suited to produce low density products but it is thought much less satisfactory for higher molecular weight resins because of the excessive viscosity in the reactor as discussed by Choi and Ray, JMS Review Macromolecular Chemical Physics C25(l), 1-55, pg. 10 (1985).

Unlike in the gas phase or slurry process, in a solution process there is usually no polymer solid or powder formed. Typically, the reaction temperature and the reaction pressure are higher than in gas phase or slurry process to maintain the polymer in solution. The solution process tends to use an inert solvent that dissolves the polymer as it is formed, subsequently the solvent is separated and the polymer is pelletized. The solution process is considered versatile in that a wide spectrum of product properties can be obtained by varying the catalyst composition, the pressure, the temperature and the comonomer employed.

Since relatively small reactors are used for a solution process, the, residence time is short and grade changeover can be rapid. For example two reactors in series operated at pressures of up to 50 bar and temperatures up to 250° C. in the reactor can be used. Fresh and recycled olefin monomer is compressed up to 55 bar and pumped into the polymerization reactor by a feed pump. The reaction is adiabatic and maintained at a maximum reactor outlet of about 250° C. Although a single reactor can be used, multiple reactors provide a narrower residence time distribution and therefore a better control of molecular weight distribution.

Step B) Oxidation

The second step of the process according to the present invention, being step B), relates to contacting the main group metal hydrocarbyl branched growth product (being the polyolefin having one or multiple main group metal end-functionalized branches) obtained in step A) with an oxidizing agent to obtain a branched polyolefin having end-functionalized branches (being the polyolefin having one or multiple end-functionalized branches).

In this functionalization (viz. oxidation) step, the intermediate product according to the present invention, viz. the polyolefin having one or multiple main group metal end-functionalized branches, can be converted into the corresponding polyolefin having one or multiple end-functionalized branches by in-situ functionalization using the appropriate agents.

Typically the functionalization consists of an oxidation step (for example $O_2$ or $CO_2$) followed by a subsequent quenching step to release the main group metal from the oxidized polyolefin chain (this can be for example an hydrolysis step by water). In this way, branched polyolefins bearing branch end-group functions such a carboxylic acid function (Pol-OH, Pol-COOH), can be obtained.

Thus, it can be said that the end product that is desired in the present invention is a branched polyolefin having any one of the end groups as shown in Table 2 at one or multiple branch ends.

Using the catalyst system according to the present invention a degree of functionalization of at least 10%, at least 20%, at least 30% of the polyolefins can be obtained, having at least one end functionalization, preferably at least 40%, or even at least 50%, or at least 60%, or at least 70%, more preferably at least 80%, even more preferably at least 90%, most preferably at least 95%.

The oxidizing agent reacts with the main group metal carbon bond of the polyolefin having one or multiple main group metal end-functionalized branches (viz. the polymeryl group).

It should be noted that depending on the reaction conditions different oxidizing agents may be preferred.

In the oxidation step, the polyolefin having one or multiple main group metal end-functionalized branches, is converted into the corresponding oxidized species, being a polyolefin having one or multiple main group metal end-functionalized oxidized branches (for example: Pol-X-M or Pol-$XY_aZ^1_b$-M or POl-$XY_aZ^1_bZ^2_c$-M;) by using an oxidizing agent of formula $XY_aZ^1_bZ^2_c$. The thus obtained product is, in a further subsequent step, hydrolyzed or treated with a quenching agent to produce the corresponding metal-free polyolefin having end-functionalized branches, being polyolefin having one or multiple end-functionalized branches, for example Pol-X, Pol-$XR^1$, Pol-$XYZ^1R^1$, Pol-$XYZ^1Z^2R^1$ (see Table 2).

As stated above, as an oxidizing agent a compound according to the Formula I: $XY_aZ^1_bZ^2_c$ may used, wherein a, b, and c may be 0 or 1. Table 1 shows an overview of possible oxidizing agents according to the present invention and several embodiments disclosed in that table are discussed below.

As oxidizing agent in step B) the following may for example be used: fluorine, chlorine, iodine, bromine, $O_2$, CO, $O_3$, $CO_2$, $CS_2$, COS, $R^2NCO$, $R^2NCS$, $R^2NCNR^3$, $CH_2=C(R^2)C(=O)OR^3$, $CH_2=C(R^2)(C=O)N(R^3)R^4$, $CH_2=C(R^2)P(=O)(OR^3)OR^4$, $N_2O$, $R^2CN$, $R^2NC$, epoxide, aziridine, cyclic anhydride, $R^3R^4C=NR^2$, $R^2C(=O)R^3$, $ClC(=O)OR^2$ and $SO_3$, preferably $O_2$, $O_3$, $N_2O$, $CO_2$ and $SO_3$, even more preferably $O_2$ and $CO_2$.

In an embodiment, when a is 1 and b and c are zero in the $XY_aZ^1_bZ^2_c$ oxidizing agent, the oxidizing agent is XY wherein Y is bonded via single bond (Formula I-H, in FIG. 1) a double (Formula I-A, in FIG. 1) or triple bond (Formula I-B, in FIG. 1) to X. Examples of this type of oxidizing agents are $F_2$, $Cl_2$, $Br_2$, and $I_2$, $O_2$, and CO respectively.

In an embodiment, when a and b are 1 and c is zero in the $XY_aZ^1_bZ^2_c$ oxidizing agent, the oxidizing agent is $XYZ^1$ wherein either Y and $Z^1$ are both bonded to X via a double bond or X is bonded to Y and $Z^1$ is bonded to Y by double bonds (Formula I-C, in FIG. 1), or wherein Y is bonded to X via a single bond and $Z^1$ is bonded to X by a triple bond (Formula I-D, in FIG. 1), or wherein X and Y and $Z^1$ form a cyclic structure by means of single bonds between X and Y and Z (Formula I-E, in FIG. 1). Examples of these oxidizing agents are $CS_2$, COS, $R^2NCO$, $R^2NCNR^3$, $R^2NCS$, $CH_2=C(R^2)C(=O)OR^3$, $N_2O$, $R^2CN$, $R^2NC$, epoxide, aziridine, and cyclic anhydride.

In an embodiment, when a, b and c are 1, the oxidizing agent is $XYZ^1Z^2$ wherein Y, $Z^1$ and $Z^2$ are each bonded to X via double bonds (Formula 1-G, in FIG. 1) or wherein Y is bonded to X via a double bond and $Z^1$ and $Z^2$ are independently bonded to X via single bonds (Formula I-F, in FIG. 1). Examples of oxidizing agents are $R^3R^4C=NR^2$, $R^2C(=O)R^3$, and $SO_3$.

In an embodiment, in the polyolefin having one or multiple end-functionalized branches, X, Y, $Z^1$ or $Z^2$ is bonded to said branch, preferably X or Y is bonded to said branch, even more preferably X is bonded to said branch.

TABLE 1

Oxidizing agents

| $XY_aZ^1_bZ^2_c$ | | | | | | | Pol-$XY_aZ^1_bZ^2_c$M | |
|---|---|---|---|---|---|---|---|---|
| Formula oxidizing agent | a | b | c | X | Y | $Z^1$ | $Z^2$ | Oxidizing agent | Main group metal oxidized branched growth product |

| Formula oxidizing agent | a | b | c | X | Y | $Z^1$ | $Z^2$ | Oxidizing agent | Main group metal oxidized branched growth product |
|---|---|---|---|---|---|---|---|---|---|
| I-A | 1 | 0 | 0 | O | O | — | — | $O_2$ | Pol-O—M |
| I-B | 1 | 0 | 0 | C | $NR^2$ | — | — | $R^2NC$ | Pol-C(=$NR^2$)—M |
| I-B | 1 | 0 | 0 | C | O | — | — | CO | Pol-C(=O)—M |
| I-C | 1 | 1 | 0 | O | O | O | — | $O_3$ | Pol-O—M |
| I-C | 1 | 1 | 0 | O | N | N | — | $N_2O$ | Pol-O—M |
| I-C | 1 | 1 | 0 | C | O | O | — | $CO_2$ | Pol-C(=O)O—M |
| I-C | 1 | 1 | 0 | C | S | S | — | $CS_2$ | Pol-C(=S)S—M |
| I-C | 1 | 1 | 0 | C | O | S | — | COS | Pol-C(=S)O—M or Pol-C(=O)S—M |

TABLE 1-continued

Oxidizing agents

| Formula oxidizing agent | $XY_aZ^1{}_bZ^2{}_c$ | | | | | | | | $Pol\text{-}XY_aZ^1{}_bZ^2{}_cM$ | |
|---|---|---|---|---|---|---|---|---|---|---|
| | a | b | c | X | Y | $Z^1$ | $Z^2$ | Oxidizing agent | Main group metal oxidized branched growth product | |
| I-C | 1 | 1 | 0 | C | $NR^2$ | O | — | $R^2NCO$ | $Pol\text{-}C(=O)N(R^2)\text{—M}$ or $Pol\text{-}C(=NR^2)O\text{—M}$ | |
| I-C | 1 | 1 | 0 | C | $NR^2$ | S | — | $R^2NCS$ | $Pol\text{-}C(=S)N(R^2)\text{—M}$ or $Pol\text{-}C(=NR^2)S\text{—M}$ | |
| I-C | 1 | 1 | 0 | $CH_2$ | $CR^2$ | $COOR^3$ | — | $CH_2=C(R^2)C(=O)OR^3$ | $Pol\text{-}CH_2C(R^2)=C(OR^3)O\text{—M}$ | |
| I-C | 1 | 1 | 0 | $CH_2$ | $CR^2$ | $C(=O)NR^3R^4$ | — | $CH_2=C(R^2)C(=O)NR^3R^4$ | $Pol\text{-}CH_2\text{—}C(R^2)=C(NR^3R^4)O\text{—M}$ | |
| I-C | 1 | 1 | 0 | $CH_2$ | $CR^2$ | $P(=O)(OR^3)OR^4$ | — | $CH_2=C(R^2)P(=O)(OR^3)OR^4$ | $Pol\text{-}CH_2\text{—}C(R^2)=P(OR^3)(OR^4)O\text{—M}$ | |
| I-C | 1 | 1 | 0 | C | $NR^2$ | $NR^3$ | — | $R^2N=C=NR^3$ | $Pol\text{-}C(=NR^2)NR^3\text{—M}$ or $Pol\text{-}C(=NR^2)NR^3\text{—M}$ | |
| I-D | 1 | 1 | 0 | C | $R^2$ | N | — | $R^2CN$ | $Pol\text{-}C(R^2)=N\text{—M}$ | |
| I-E | 1 | 1 | 0 | $C(R^2)R^3$ | $C(R^4)R^5$ | O | — | epoxide | $Pol\text{-}C(R^2)R^3C(R^4)R^5O\text{—M}$ | |
| I-E | 1 | 1 | 0 | $C(R^2)R^3$ | $C(R^4)R^5$ | $NR^6$ | — | aziridine | $Pol\text{-}C(R^2)R^3C(R^4)R^5NR^6\text{—M}$ | |
| I-E | 1 | 1 | 0 | C=O | $R^2$ | $C(=O)O$ | — | cyclic anhydride: $\text{—}C(=O)R^2C(=O)O\text{—}$ | $Pol\text{-}C(=O)\text{—}R^2\text{—}C(=O)O\text{—M}$ | |
| I-F | 1 | 1 | 1 | C | $NR^2$ | $R^3$ | $R^4$ | $R^3R^4C=NR^2$ | $Pol\text{-}C(R^3R^4)\text{—}N(R^2)\text{—M}$ | |
| I-F | 1 | 1 | 1 | C | O | $R^2$ | $R^3$ | $R^2C(=O)R^3$ | $Pol\text{-}C(R^2)(R^3)O\text{—M}$ | |
| I-F | 1 | 1 | 1 | C | O | $OR^2$ | Cl | $ClC(=O)OR^2$ | $Pol\text{-}C(=O)OR^2 + M\text{—Cl}$ | |
| I-G | 1 | 1 | 1 | S | O | O | O | $SO_3$ | $Pol\text{-}S(=O)_2O\text{—M}$ | |
| I-H | 1 | 0 | 0 | F/Cl/Br/I | F/Cl/Br/I | — | — | $F_2/Cl_2/Br_2/I_2$ | $Pol\text{-}F/Cl/Br/I + M\text{—}F/Cl/Br/I$ | |

TABLE 2

Polyolefins having end-functionalized branches

| Formula oxidizing agent | $XY_aZ^1{}_bZ^2{}_c$ | | | | $Pol\text{-}XY_aZ^1{}_bZ^2{}_cR^1{}_d$ | |
|---|---|---|---|---|---|---|
| | Polyolefin having end-functionalized branches | a | b | c | d | incorporated into product (X/Y/Z) |
| I-A | $Pol\text{-}OR^1$ | 0 | 0 | 0 | 1 | X |
| I-B | $Pol\text{-}C(=NR^2)R^1$ | 1 | 1 | 0 | 1 | XY |
| I-B | $Pol\text{-}C(=O)R^1$ | 1 | 0 | 0 | 1 | X&Y |
| I-C ($O_3$) | $Pol\text{-}OR^1$ | 0 | 0 | 0 | 1 | X |
| I-C ($N_2O$) | $Pol\text{-}OR_1$ | 0 | 0 | 0 | 1 | X |
| I-C | $Pol\text{-}C(=O)OR^1$ | 1 | 1 | 0 | 1 | $X\&Y\&Z^1$ |
| I-C | $Pol\text{-}C(=S)SR^1$ | 1 | 1 | 0 | 1 | $X\&Y\&Z^1$ |
| I-C | $Pol\text{-}C(=S)OR^1$ or $Pol\text{-}C(=O)SR^1$ | 1 | 1 | 0 | 1 | $X\&Y\&Z^1$ |
| I-C | $Pol\text{-}C(=O)N(R^2)R^1$ or $Pol\text{-}C(=NR^2)OR^1$ | 1 | 1 | 0 | 1 | $X\&Y\&Z^1$ |
| I-C | $Pol\text{-}C(=S)N(R^2)R^1$ or $Pol\text{-}C(=NR^2)SR^1$ | 1 | 1 | 0 | 1 | $X\&Y\&Z^1$ |
| I-C | $Pol\text{-}CH_2\text{—}C(R^2)=C(OR^3)OR^1$ | 1 | 1 | 0 | 1 | $X\&Y\&Z^1$ |
| I-C | $Pol\text{-}CH_2\text{—}C(R^2)=C(NR^3R^4)OR^1$ | 1 | 1 | 0 | 1 | $X\&Y\&Z^1$ |
| I-C | $Pol\text{-}CH_2\text{—}C(R^2)=P(OR^3)(OR^4)OR^1$ | 1 | 1 | 0 | 1 | $X\&Y\&Z^1$ |
| I-C | $Pol\text{-}C(=NR^2)NR^3R^1$ or $Pol\text{-}C(=NR^3)NR^2R^1$ | 1 | 1 | 0 | 1 | $X\&Y\&Z^1$ |
| I-D | $Pol\text{-}C(R^2)=NR^1$ | 1 | 1 | 0 | 1 | $X\&Y\&Z^1$ |
| I-E | $Pol\text{-}C(R^2)R^3C(R^4)R^5OR^1$ | 1 | 1 | 0 | 1 | $X\&Y\&Z^1$ |
| I-E | $Pol\text{-}C(R^2)R^3C(R^4)R^5NR^6R^1$ | 1 | 1 | 0 | 1 | $X\&Y\&Z^1$ |
| I-E | $Pol\text{-}C(=O)\text{—}R^2\text{—}C(=O)OR^1$ | 1 | 1 | 0 | 1 | $X\&Y\&Z^1$ |
| I-F | $Pol\text{-}C(R^3R^4)\text{—}N(R^2)R^1$ | 1 | 1 | 1 | 1 | $X\&Y\&Z^1Z^2$ |
| I-G | $Pol\text{-}S(=O)_2OR^1$ | 1 | 1 | 1 | 1 | $X\&Y\&Z^1Z^2$ |
| I-F | $Pol\text{-}C(R^2)(R^3)OR^1$ | 1 | 1 | 1 | 1 | $X\&Y\&Z^1Z^2$ |
| I-F | $Pol\text{-}C(=O)OR^2$ | 1 | 1 | 0 | 0 | $X\&Y\&Z^1$ |
| I-H | $Pol\text{-}F/Cl/Br/I$ | 0 | 0 | 0 | 0 | X |

The oxidizing agents as specified in Table 1 will be discussed in more detail here.

With respect to, for example, $Cl_2$ or another halogen the metal carbon bond in the M-Pol species is cleaved and a Pol-Cl and M-Cl bond are formed directly during the oxidation step. The resulting product has the formula Pol-X wherein X is I, Br, F or Cl. Without wishing to be bound by theory, when a halogen (for example $Cl_2$) is used, there are no oxidized branches formed. Instead, the metal is detached from the polymer chain and the end product is directly formed.

With respect to $O_2$, the metal carbon bond is cleaved and $O_2$ is inserted to form a peroxide. This initially formed peroxide decomposes to the metal alkoxide: M-Pol→M-O—O-Pol→M-O-Pol. After work up an alcohol, ether or ester functionalized branched polyolefin (Pol-OH, Pol-$OR^1$ or Pol-$OC(=O)R^1$) is obtained depending on the quenching procedure.

With respect to CO, the metal carbon bond is cleaved and CO is inserted to form a Pol-C(=O)-M. After work up either an aldehyde or ketone functionalized branched polyolefin (Pol-C(=O)H or Pol-C(=O)$R^1$) is obtained depending on the quenching procedure.

With respect to $R^2NC$, the metal carbon bond is cleaved and $R^2NC$, is inserted to form a Pol-C(=NR$^2$)-M. After work up either (Pol-C(=NR$^2$)H or Pol-C(=NR$^2$)R$^1$) is obtained depending on the quenching procedure. With respect to $O_3$, the metal carbon bond is cleaved and O is inserted to form M-O-Pol. After work up, an alcohol, ether or ester functionalized branched polyolefin (Pol-OH, Pol-OR$^1$ or Pol-OC(=O)R$^1$) is obtained depending on the quenching procedure.

With respect to $CO_2$, the oxidizing agent inserts in the metal-carbon bond of the M-Pol to yield the corresponding Pol-C(=O)O-M functionality. After work up either an acid or ester functionalized branched polyolefin (Pol-C(=O)OH or Pol-C(=O)OR$^1$) is obtained depending on the quenching procedure.

With respect to $CS_2$, the oxidizing agent inserts in the metal-carbon bond of the M-Pol to yield the corresponding Pol-C(=S)S-M functionality. After work up either thioester functionalized branched polyolefin (Pol-C(=S)SH or Pol-C(=S)SR$^1$) is obtained depending on the quenching procedure.

With respect to COS, the oxidizing agent inserts in the metal-carbon bond of the M-Pol to yield the corresponding Pol-C(=S)O-M or Pol-C(=O)S-M functionality. After work up either a thiol/oxygen-acid or thiol/oxygen-ester functionalized branched polyolefin (Pol-C(=O)SH and Pol-C(=S)OH or Pol-C(=O)SR$^1$ and Pol-C(=S)OR$^1$) is obtained depending on the work up procedure.

With respect to $R^2NCO$, the oxidizing agent inserts in the metal-carbon bond of the M-Pol to yield the corresponding Pol-C(=NR$^2$)O-M or Pol-C(=O)NR$^2$-M functionality. After quenching, amide or imino functionalized branched polyolefin (Pol-C(=O)NR$^2$H, Pol-C(=NR$^2$)OH, Pol-C(=O)NR$^2$R$^1$ and Pol-C(=NR$^2$)OR$^1$) are obtained depending on the work up procedure.

With respect to $R^2NCS$, the oxidizing agent inserts in the metal-carbon bond of the M-Pol to yield the corresponding Pol-C(=NR$^2$)S-M or Pol-C(=S)NR$^2$-M functionality. After work up thiomidic acid, thioamide or thioamidate (ester) functionalized branched polyolefin e.g. (Pol-C(=S)NR$^2$H, Pol-C(=NR$^2$)SH, Pol-C(=S)NR$^2$R$^1$ and Pol-C(=NR$^2$)SR$^1$) is obtained on the work up procedure.

With respect to $R^2NCNR^3$, the oxidizing agent inserts in the metal-carbon bond of the M-Pol to yield the corresponding Pol-C(=NR$^2$)NR$^3$-M or Pol-C(=NR$^3$)NR$^2$-M functionality. After work up an amide functionalized branched polyolefin (Pol-C(=NR$^2$)NR$^3$R$^1$ is obtained.

With respect to $CH_2$=CR$^2$COOR$^3$, the metal carbon bond is cleaved and the oxidizing agent is inserted to form a Pol-CH$_2$CR$^2$=C(OR$^3$)O-M. After quenching either a hemiacetal or acetal functionalized branched polyolefin (Pol-CH$_2$CR$^2$=C(OR$^3$)OH or Pol-CH$_2$CR$^2$=C(OR$^3$)OR$^1$) is obtained depending on the quenching procedure.

With respect to $CH_2$=C(R$^2$)C(=O)NR$^3$R$^4$, the metal carbon bond is cleaved and the oxidizing agent is inserted to form a Pol-CH$_2$—C(R$^2$)=C(NR$^3$R$^4$)O-M. After quenching a functionalized branched polyolefin of formula Pol-CH$_2$—C(R$^2$)=C(NR$^3$R$^4$)OR$^1$ is obtained.

With respect to $CH_2$=C(R$^2$)P(=O)(OR$^3$)OR$^4$, the metal carbon bond is cleaved and the oxidizing agent is inserted to form a Pol-CH$_2$—C(R$^2$)=P(OR$^3$)(OR$^4$)O-M. After quenching a functionalized branched polyolefin of formula Pol-CH$_2$—C(R$^2$)=P(OR$^3$)(OR$^4$)OR$^1$ is obtained.

With respect to $N_2O$, the metal carbon bond is cleaved and oxygen is inserted to form a Pol-O-M After quenching either an alcohol or ether functionalized branched polyolefin (Pol-OH or Pol-OR$^1$) is obtained depending on the quenching procedure.

With respect to $R^2CN$, the metal carbon bond is cleaved and the oxidizing agent is inserted to form a Pol-C(R$^2$)=N-M. After quenching either a substituted or non-substituted imine functionalized branched polyolefin (Pol-C(R$^2$)=NR$^1$ or Pol-C(R$^2$)=NH) is obtained on the quenching procedure.

With respect to epoxide, the metal carbon bond is cleaved and the oxidizing agent is inserted to form a Pol-C(R$^2$)R$^3$C(R$^4$)R$^5$O-M. After quenching an alcohol, ether or ester functionalized branched polyolefin (Pol-C(R$^2$)R$^3$C(R$^4$)R$^5$OH, Pol-C(R$^2$)R$^3$C(R$^4$)R$^5$OR$^1$ or Pol-C(R$^2$)R$^3$C(R$^4$)R$^5$OC(=O)R$^1$) is obtained depending on the quenching procedure.

With respect to aziridine, the metal carbon bond is cleaved and the oxidizing agent is inserted to form a Pol-C(R$^2$)R$^3$C(R$^4$)R$^5$NR$^6$-M. After quenching an amine or amide functionalized branched polyolefin (Pol-C(R$^2$)R$^3$C(R$^4$)R$^5$NR$^6$H, Pol-C(R$^2$)R$^3$C(R$^4$)R$^5$NR$^6$R$^1$ or Pol-C(R$^2$)R$^3$C(R$^4$)R$^5$NR$^6$C(=O)R$^1$) is obtained depending on the quenching procedure.

With respect to cyclic anhydride, the metal carbon bond is cleaved and the oxidizing agent is inserted to form a Pol-C(=O)—R$^2$—C(=O)O-M. After quenching either a anhydride-acid or anhydride-ester functionalized branched polyolefin (Pol-C(=O)—R$^2$—C(=O)OH or Pol-C(=O)—R$^2$—C(=O)OR$^1$) is obtained depending on the quenching procedure.

With respect to imine, the metal carbon bond is cleaved and the oxidizing agent is inserted to form a Pol-C(R$^3$)(R$^4$)—N(R$^2$)-M. After work up an amine functionalized branched polyolefin (Pol-CR$^3$R$^4$NR$^2$H or Pol-CR$^3$R$^4$NR$^2$R$^1$) is obtained depending on the work up procedure.

With respect to $SO_3$, the metal carbon bond is cleaved and the oxidizing agent is inserted to form a Pol-S(=O)$_2$O-M. After quenching either a sulfonic acid or sulfonic acid ester functionalized branched polyolefin (Pol-S(=O)$_2$OH or Pol-S(=O)$_2$OR$^1$) is obtained depending on the quenching procedure.

With respect to a ketone or aldehyde, the metal carbon bond is cleaved and the oxidizing agent is inserted to form a Pol-C(R$^2$)(R$^3$)O-M. After quenching an alcohol, ether or ester functionalized branched polyolefin (Pol-CR$^2$R$^3$OH, Pol-CR$^2$R$_3$OR$^1$ or Pol-CR$^2$R$^3$OC(=O)R$^1$) is obtained depending on the quenching procedure.

With respect to a halogen containing organic agent, for example, the metal carbon bond is cleaved and Pol-C(=O)OR$^2$ and M-Hal are formed. Without wishing to be bound by theory, when a halogen containing organic agent, such as ClC(=O)OR, is used, there are no oxidized branches formed. Instead, the metal is detached from the polymer chain and the final product is directly formed during the oxidation process.

$R^1$, $R^2$, $R^3$, $R^4$, $R^5$, $R^6$ are each independently selected from the group consisting of H, SiR$_3^7$, SnR$_3^7$ or a C1-C16 hydrocarbyl, preferably a C1-C4 hydrocarbyl, where $R^7$ is selected from the group consisting of C1-C16 hydrocarbyl.

The reaction conditions for the oxidation step B) can be determined by a skilled person based on e.g. the type of polyolefin used and the type of oxidizing agent used.

In an embodiment, the oxidation step is carried at a pressure between 1 and 80 bar. In an embodiment, the oxidation step is carried out at a temperature of between 0° C. and 250° C.

In an embodiment, the oxidation step is carried out for a time period of between 0.5 minutes and 150 minutes, more preferably between 1 minutes and 120 minutes, depending on the reaction temperature and the oxidizing agent.

It should be noted that depending on the reaction conditions different oxidizing agents may be preferred.

During step C) a quenching agent is used to remove the main group metal from the oxidized branch ends to obtain a branched polymer. Said quenching step can preferably carried out using a hydrolyzing agent or another non-protic metal-substituting agent, which can for example remove the metal to get a polar functionality.

In an embodiment, said quenching agent is a hydrolyzing agent, which is a protic molecule, e.g. water or an alcohol, especially for example such as as (acidified) methanol or ethanol, preferably water.

In an embodiment, said quenching agent is typically a halogen-containing agent releasing a metal-halide or an anhydride releasing a metal-carboxylate. Typical examples are alkyl halides and anhydrides.

This leads to a method for preparing polyolefins (Pols), such as polyethylene (PE, HDPE, LDPE, LLPDE), polypropylene (PP) and many others bearing diverse end-group functions including, but not limited to, a halogen function (e.g. Pol-Cl), ketone function (Pol-C(=O)R), ketamine function (Pol-C(=NR$^2$)R$^1$), carboxylic acid function (Pol-COOH), a thiolic acid function (Pol-C(=O)SH, a thionic acid function (Pol-C(=S)OH), a dithio acid function (Pol-C(=S)SH), an alcohol function (Pol-OH), an ether function (Pol-OR$^1$), an amine function (Pol-N(R$^2$)R$^1$), a thiol function (Pol-SH), an amidine function (Pol-C(=NR$^2$)N(R$^3$)R$^1$), an amide function (Pol-C(=O)N(R$^2$)R$^1$), an ester function (Pol-C(=O)OR), a thioester function (Pol-C(=O)SR$^1$), a dithioester function (Pol-C(=S)SR$^1$) a hemiacetal (Pol-CH$_2$CR$^2$=C(OR$^3$)—OH) or an acetal function (Pol-CH$_2$CR$^2$=C(OR$^3$)—OR$^1$).

Using the catalyst system according to the present invention a degree of functionalization of at least 30% of the polyolefins can be obtained, preferably at least 40%, or even at least 50%, or at least 60% or at least 70%, more preferably at least 80%, even more preferably at least 90%, most preferably at least 95%.

In an embodiment, branched polyolefins having one or multiple end-functionalized branches have a number average molecular weight ($M_n$) between 500 and 1,000,000 g/mol, preferably between 1000 and 200.000 g/mol.

The polyolefins having one or multiple end-functionalized branches according to the present invention preferably have a polydispersity index (Đ) of between 1.1 and 10.0, more preferably between 1.1 and 5.0, more preferably between 1.1 and 4.0, even more preferably between 1.5 and 2.5.

Using the process according to the present invention, polyolefins having one or multiple end-functionalized branches can be obtained.

The polyolefins having one or multiple end-functionalized branches according to the present invention have a formula according to:

 (Formula 1.1)

In an embodiment, when a is 0, b is 0, c is 0, d is 1, the polyolefin has formula Pol-XR$^1$, and X is selected from the group consisting of O and S.

In an embodiment, when a is 1, b is 0, c is 0, d is 1, the polyolefin has formula Pol-XYR$^1$, and when X is C, then Y is selected from the group consisting of NR$^2$ and O.

In an embodiment, when a is 1 and b is 1 and c is 0 and d is 1, the polyolefin has formula Pol-XYZ$^1$R$^1$, and when X is C then Y is selected from the group consisting of O, S, NR$^2$ and Z$^1$ is selected from the group consisting of O and S.

In an embodiment, when a is 1 and b is 1 and c is 0 and d is 1, the polyolefin is according to the formula Pol-XYZ$^1$R$^1$, and when X is C, Y is R$^2$ and Z$^1$ is N, In an embodiment, when a is 1 and b is 1 and c is 0 and d is 1, the polyolefin is according to the formula Pol-XYZ$^1$R$^1$, and when X is C(R$^2$)(R$^3$), Y is C(R$^4$)(R$^5$) and Z$^1$ is selected from the group consisting of O and NR$^6$.

In an embodiment, when a is 1 and b is 1 and c is 0 and d is 1, the polyolefin is according to the formula Pol-XYZ$^1$R$^1$, and when X is CH$_2$, Y is C(R$^2$) and Z$^1$ is selected from the group consisting of C(OR$^3$)O, C(NR$^3$R$^4$)O and P(OR$^3$)(OR$^4$)O.

In an embodiment, when a is 1 and b is 1 and c is 0 and d is 1, the formula is Pol-XYZ$^1$R$^1$, and when X is C=O, Y is R$^2$ and Z$^1$ is COO.

In an embodiment, when a is 1 and b is 1 and c is 0 and d is 1, the formula Pol-XYZ$^1$R$^1$, and when X is C, Y is (=NR$^2$), Z$^1$ is NR$^3$.

In an embodiment, when a is 1, and b is 1 and c is 1 and d is 1, the formula is Pol-XYZ$^1$Z$^2$R$^1$, and when X is selected from the group consisting of S and Y is O and Z$^1$ and Z$^2$ are O.

In an embodiment, when a is 1, and b is 1 and c is 1 and d is 1, the formula is Pol-XYZ$^1$Z$^2$R$^1$, and when X is C, Y is O and Z$^1$ is R$^2$ and Z$^2$ is R$^3$.

In an embodiment, when a is 1, and b is 1 and c is 1 and d is 1, the formula is Pol-XYZ$^1$Z$^2$R$^1$, and when X is C, Y is NR$^2$ and Z$^1$ is R$^3$ and Z$^2$ is R$^4$.

In an embodiment, when a is 1, and b is 1 and c is 0 and d is 0, the formula is Pol-XYZ$^1$, and when X is C, Y is O and Z$^1$ is OR$^2$.

In an embodiment, when a is 0, b is 0 c is 0 and d is 0, the formula is Pol-X (and X is selected from the group consisting of Cl, Br, F and I.

The polyolefins having end-functionalized branches may be composed of polyolefin blocks, which blocks may be linear or branched (both branched and short chain branched), atactic or isotactic, preferably, isotactic polyolefins in the case of poly-α-olefins, wherein the isotactic polyolefin is preferably isotactic polypropylene.

An advantage of the present invention is that branched polyolefins having end-functionalized branches can be obtained with a simple process for example in one single series of connected reactors in a continuous maner.

The branched polyolefins having end-functionalized branches prepared according to the present invention may for example be used to introduce polar properties to enhance the interfacial interactions in polyolefins blends with polar polymers or blends with different polyolefins with PEs. They may be used for example as compatibilizers to improve properties such as adhesion. They may be used to improve barrier properties (especially against oxygen) for polyolefin films. They may be used as compatibilizer to highly polar polymers such as for example starch or for polyolefin-based composites with inorganic fillers such as glass or talcum. They may be used in drug delivery devices or nonporous materials/membranes.

Another advantage of the present invention is that β-H transfer or elimination during step A) of olefin polymerization process is effectively blocked due to the use of a chain transfer reaction. Beta-hydride (or β-H) elimination is a reaction in which a polymeryl group containing β-hydrogens bonded to a metal center is converted into the corresponding macromolecular alkene and the corresponding metal-bonded hydride. Beta-hydride (or β-H) transfer to monomer is a reaction in which a polymeryl group containing β-hydrogens bonded to a metal center is converted into a macromolecular alkene and the hydride is transferred to an olefin coordinated to the metal thus forming another alkyl group bonded to said metal center. Alternatively, β-alkyl transfer or elimination is also known. In this case, the polymeryl must have an alkyl group (typically a methyl) on the β-carbon. β-Alkyl transfer or elimination typically results in unsaturated macromolecules, containing an allyl chain end, and a new metal alkyl. These are undesired processes since they lead to non-end-functionalized polyolefins.

EXAMPLES

The invention is further illustrated by the following non-limiting examples merely used to further explain certain embodiments of the present invention.

General Considerations

All manipulations were performed under an inert dry nitrogen atmosphere using either standard Schlenk or glove box techniques. Dry, oxygen free toluene was employed as solvent for all polymerizations. rac-Me$_2$Si(Ind)$_2$ZrCl$_2$ (zirconocene complex) was purchased from MCAT GmbH, Konstanz, Germany. Methylaluminoxane (MAO, 30 wt. % solution in toluene) was purchased from Chemtura. Diethyl zinc (1.0 M solution in hexanes), tri(isobutyl) aluminum (1.0 M solution in hexanes), Tetrachloroethane-d$_2$ was purchased from Sigma Aldrich. ODIBA is di(isobutyl)(7-octen-1-yl) aluminum, NDIBA is bis(isobutyl)(5-ethylen-yl-2-norbornene) aluminum, DEZ: diethyl zinc (additional chain shuttling agent), TIBA is tri(isobutyl) aluminum (additional chain transfer agent).

Method of Analyzing the Products

After the reaction has ended, the products were removed from the reactor and purified by repeatedly washing with acidic ethanol (containing 5-10% concentrated hydrochloric acid) and dried under vacuum at 60° C. for 18 hours.

Several analyses were carried out on the products to determine the yield, the percentage functionalization, the molecular weight and the polydispersity index (Đ). The yield was determined by weighing the powder obtained. The percentage of functionalization was determined by $^1$H NMR carried out at 130° C. using deuterated tetrachloroethane (TCE-d$_2$) as the solvent. The molecular weight (M$_n$ and M$_w$) in kilograms per mole and the Đ were both determined by means of HT-SEC. High temperature size exclusion chromatography was performed at 160° C. using a high speed GPC (Freeslate, Sunnyvale, USA). Detection: IR4 (PolymerChar, Valencia, Spain). Column set: three Polymer Laboratories 13 μm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding Đ were calculated from HT SEC analysis with respect to narrow polyethylene standards (Đ≤1.5 by PSS, Mainz, Germany).

$^1$H NMR Characterization.

$^1$H NMR analysis carried out at 120-130° C. using deuterated tetrachloroethane (TCE-d$_2$) as the solvent and recorded in 5 mm tubes on a Varian Mercury spectrometer operating at frequencies of 400 MHz. Chemical shifts are reported in ppm versus tetramethylsilane and were determined by reference to the residual solvent.

Heteronuclear multiple-bond correlation spectra (HMBC) were recorded with pulse field gradients. The spectral windows for $^1$H and $^{13}$C axes were 6075.3 and 21367.4 Hz, respectively. The data were collected in a 2560×210 matrix and processed in a 1K×1K matrix. The spectra were recorded with the acquisition time 0.211 s, relaxation delay 1.4 s and number of scans equal to 144×210 increments.

Solid-state $^{13}$C{$^1$H} Cross-Polarization/Magic-Angle Spinning (CP/MAS) NMR and $^{13}$C{$^1$H} Insensitive Nuclei Enhanced by Polarization Transfer (INEPT) experiments were carried out on a Bruker AVANCE-III 500 spectrometer employing a double-resonance H—X probe for rotors with 2.5 mm outside diameter. These experiments utilized a MAS frequency of 25.0 kHz, a 2.5 μs/2 pulse for $^1$H and $^{13}$C, a CP contact time of 2.0 ms and TPPM decoupling during acquisition. The CP conditions were pre-optimized using L-alanine. The $^{13}$C{$^1$H} INEPT spectra were recorded using the refocused-INEPT sequence with a J-evolution period of either ⅓ J$_{CH}$ or ⅙ J$_{CH}$ assuming a $^1$J$_{CH}$ of 150 Hz, i.e. for a J-evolution time of ⅓ J$_{CH}$ the signals from CH and CH$_3$ groups are positive, while those of CH$_2$ are negative. The 2D $^1$H-$^1$H double quantum-single quantum (DQ-SQ) correlation experiments and DQ build-up experiments were carried out on a Bruker AVANCE-III 700 spectrometer using a 2.5 mm solid-state MAS double-resonance probe. These experiments employed a spinning frequency of 25.0 kHz. DQ excitation and reconversion was performed using the broadband back-to-back (BaBa) sequence. Chemical shifts for 1H and 13C are reported relative to TMS using solid adamantane as an external.

Size Exclusion Chromatoqraphy (SEC).

The molecular weight (M$_n$ and M$_w$) in g/mol and the Đ were determined by means of high temperature size exclusion chromatography which was performed at 160° C. using a high speed GPC (Freeslate, Sunnyvale, USA). Detection: IR4 (PolymerChar, Valencia, Spain). Column set: three Polymer Laboratories 13 μm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding Đ were calculated from HT SEC analysis with respect to narrow polyethylene standards (PSS, Mainz, Germany). HT SEC of copolymers was performed at 160° C. on a Polymer Laboratories PLXT-20 Rapid GPC Polymer Analysis System (refractive index detector and viscosity detector) with 3 PLgel Olexis (300×7.5 mm, Polymer Laboratories) columns in series. TCB was used as eluent at a flow rate of 1 mL·min$^{-1}$. The molecular weights (M$_n$ and M$_w$) were calculated with respect to polyethylene standards (Polymer Laboratories). A Polymer Laboratories PL XT-220 robotic sample handling system was used as autosampler.

Differential Scanning Calorimetry (DSC).

Melting (T$_m$) and crystallization (T$_c$) temperatures as well as enthalpies of the transitions were measured by differential scanning calorimetry (DSC) using a DSC Q100 from TA Instruments. The measurements were carried out at a heating and cooling rate of 10° C.·min$^{-1}$ from −60° C. to 160° C. The transitions were deduced from the second heating and cooling curves All manipulations were performed under an inert dry nitrogen atmosphere using either standard Schlenk or glove box techniques. Dry, oxygen-free toluene was employed as solvent for all polymerizations. Triphenylcarbenium tetrakis (pentafluorophenyl) borate ([Ph$_3$C][B(C$_6$F$_5$)$_4$]) and di(isobutyl)aluminum hydride purchased from Sigma Aldrich. 1,7-Octadiene and 5-vinyl-2-norbornene were purchased from Sigma Aldrich and dried with 4-Å molecular sieves under an inert atmosphere. Methylaluminoxane (MAO, 30 wt. % solution in toluene) was purchased from Chemtura. Tri(isobutyl) aluminum (1.0 M solution in hexanes) purchased from Aldrich. rac-Me2Si(Ind)2ZrCl2 was purchased from MCAT GmbH, Konstanz, Germany.

Synthesis of di(isobutvl)(oct-7-en-1-yl)aluminum and bis(isobutyl)(5-ethylen-yl-2-norbornene) aluminum Di(isobutyl)(oct-7-en-1-yl)aluminum and bis(isobutyl)(5-ethylen-yl-2-norbornene) aluminum ((2-(bicyclo[2.2.1]hept-5-en-2-yl)ethyl)di(isobutyl)aluminum) were synthesized by hydroalumination of excess 1,7-octadiene and 5-vinyl-2-norbornene using di(isobutyl)aluminum hydride at 60° C. for 6 h in a 200 mL Schlenk flask equipped with a magnetic stirrer. The remaining reagents (1,7-octadiene and 5-vinyl-2-norbornene) after the hydroalumination reaction were removed by evacuation.

Copolymerization Procedure.

Copolymerization reactions were carried out in stainless steel Büchi reactors (300 mL). Prior to the polymerization, the reactor was dried in vacuo at 40° C. and flushed with dinitrogen. Toluene (70 mL) and ODIBA or NDIBA (second type of olefin monomer comprising a chain transfer agent functionality) solution in toluene (20 mL, Al/Zr≈285) were added and stirred at 50 rpm for 30 min. Polymerization was started by addition of DEZ (1.0 mL, 1.0 M solution in hexanes, Al/Zr≈50 equiv.) the zirconocene complex and optionally MAO or TIBA. The solutions were saturated with predefined amount of ethylene (first type of olefin monomer). The reactors were then pressurized to the desired pressure (2 bars) with ethylene and the pressure was maintained for a predefined time (5 min). At the end of the reaction, the ethylene feed was stopped and the residual ethylene was vented off. The mixture was brought into contact with synthetic air at 60° C. for 2.0 h before quenching with the acidified methanol. The precipitated powder was filtered out and dried under vacuum at 60° C. for 18 h.

The invention claimed is:

1. A process for the preparation of a polyolefin having one or multiple end-functionalized branches, said process comprising the step of:
   A) a polymerization step comprising copolymerizing at least one first type of olefin monomer and at least one second type of olefin monomer containing a main group metal hydrocarbyl chain transfer agent functionality according to Formula 1a:

$$R^{100}_{(n-2)}R^{101}M^{n+}R^{102}$$ (Formula 1a)

using a catalyst system to obtain a polyolefin having one or multiple main group metal end-functionalized branches; wherein said catalyst system comprises:
   i) a metal catalyst or metal catalyst precursor comprising a metal from Group 3-10 of the IUPAC Periodic Table of elements, and
   ii) optionally a co-catalyst;
   iii) an additional chain transfer and/or chain shuttling agent selected from the group consisting of hydrocarbyl aluminum, hydrocarbyl magnesium, hydrocarbyl zinc, hydrocarbyl gallium, hydrocarbyl boron, hydrocarbyl calcium, aluminum hydride, magnesium hydride, zinc hydride, gallium hydride, boron hydride, calcium hydride and a combination thereof;
   wherein
   M is a main group metal;
   n is the oxidation state of M;

$R^{100}$, $R^{101}$ and $R^{102}$ of Formula 1a are each independently selected from the group consisting of a hydride, a C1-C18 hydrocarbyl group, or a hydrocarbyl group Q with the proviso that at least one of $R^{100}$, $R^{101}$ and $R^{102}$ is a hydrocarbyl group Q, wherein hydrocarbyl group Q is according to Formula 1b:

(Formula 1b)

wherein
   Z is bonded to M and Z is a C1-C18 hydrocarbylene group;
   $R^{105}$ optionally forms a cyclic group with Z;
   $R^{103}$ and $R^{104}$ and $R^{105}$ are each independently selected from hydrogen or a hydrocarbyl group;
   B) an oxidizing step comprising contacting said polyolefin having one or multiple main group metal end-functionalized branches obtained in step A) with an oxidizing agent to obtain a polyolefin having one or multiple main group metal end-functionalized oxidized branches; and
   C) contacting said polyolefin having one or multiple main group metal end-functionalized oxidized branches obtained in step B) with a quenching agent to remove the main group metal from the oxidized branch ends to obtain the polyolefin having one or multiple end-functionalized branches.

2. The process according to claim 1, wherein said oxidizing agent used in step B) is an oxidizing agent according to Formula I:

$$XY_aZ^1_bZ^2_c$$ (Formula I)

wherein a is 1, b and c are each independently 0 or 1 and X, Y, $Z^1$ and $Z^2$ are independently selected from carbon, hydrocarbyl, heteroatom and halogen.

3. The process according to claim 1, wherein the oxidizing agent used in step B) is selected from the group consisting of fluorine, chlorine, iodine, bromine, $O_2$, CO, $O_3$, $CO_2$, $CS_2$, COS, $R^2$NCO, $R^2$NCS, $R^2$NCNR$^3$, $CH_2$=C($R^2$)C(=O)O$R^3$, $CH_2$=C($R_2$)(C=O)N($R^3$)$R^4$, $CH_2$=C($R^2$)P(=O)(O$R^3$)O$R^4$, $N_2$O, $R^2$CN, $R^2$NC, epoxide, aziridine, cyclic anhydride, $R^3R^4$C=N$R^2$, $R^2$C(=O)$R^3$, ClC(=O)O$R^2$ and $SO_3$.

4. The process according to claim 1, wherein the additional chain transfer and/or chain shuttling agent used in step A) is selected from the group consisting of hydrocarbyl aluminum, hydrocarbyl magnesium, hydrocarbyl zinc, hydrocarbyl gallium, hydrocarbyl boron, hydrocarbyl calcium, or a combination thereof.

5. The process according to claim 1,
   wherein at least one of $R^{100}$, $R^{101}$ and $R^{102}$ is a hydrocarbyl group Q and the remaining groups of $R^{100}$, $R^{101}$ and $R^{102}$ are each a C1-C4 hydrocarbyl group or
   wherein two groups of $R^{100}$, $R^{101}$ and $R^{102}$ are each a hydrocarbyl group Q and the remaining group of $R^{100}$, $R^{101}$ and $R^{102}$ is a C1-C4 hydrocarbyl group or
   wherein all of $R^{100}$, $R^{101}$ and $R^{102}$ are a hydrocarbyl group Q.

6. The process according to claim 1, wherein the hydrocarbyl group Q according to Formula 1b attached to a main group metal is a linear α-olefin group or a cyclic unsaturated hydrocarbyl group.

7. The process according to claim 1, wherein the at least one second type of olefin monomer is selected from the group consisting of bis(isobutyl)(5-ethylen-yl-2-norbornene) aluminum, di(isobutyl)(7-octen-1-yl) aluminum, di(isobutyl)(5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris(3-buten-1-yl) aluminum, ethyl(5-ethylen-yl-2-norbornene) zinc, ethyl(7-octen-1-yl) zinc, ethyl(5-hexen-1-yl) zinc, ethyl(3-buten-1-yl) zinc, bis(5-ethylen-yl-2-norbornene) zinc, bis(7-octen-1-yl) zinc, bis(5-hexen-1-yl) zinc, and bis(3-buten-1-yl) zinc.

8. The process according to claim 1, wherein the co-catalyst is selected from the group consisting of MAO, DMAO, MMAO, SMAO, fluorinated aryl borane and fluorinated aryl borate.

9. The process according to claim 1, wherein the metal catalyst or metal catalyst precursor used in step A) comprises a metal selected from the group consisting of Ti, Zr, Hf, V, Cr, Fe, Co, Ni, and Pd.

10. The process according to claim 9, wherein said metal catalyst precursor is a an indenyl substituted zirconium dihalide.

11. The process according to claim 9, wherein said metal catalyst precursor is [Me$_2$Si(C$_5$Me$_4$)N(tBu)]TiCl$_2$ or [N-(2,6-di(1-methylethyl)phenyl)amido)(2-isopropylphenyl)(α-naphthalen-2-diyl(6-pyridin-2-diyl)methane)]hafnium dimethyl.

12. The process according to claim 1, wherein the at least one first type of olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclopentene, cyclohexene, norbornene, ethylidene norbornene, vinylidene norbornene and a combination thereof.

13. A polyolefin obtained by a process according to claim 1 having one or multiple end-functionalized branches, having a number average molecular weight (Me) between 500 and 1,000,000 g/mol and having a polydispersity index (D) of between 1.1 and 10.0 and wherein said polyolefin has a degree of functionalization of at least 30%,
wherein said polyolefin having one or multiple end-functionalized branches is according to Formula I.I:

Pol-XY$_a$Z$^1_b$Z$^2_c$R$^1_d$  (Formula I.I), wherein
a, b, c and d are each independently 0 or 1,
X, Y, Z$^1$, Z$^2$ are each independently selected from carbon, hydrocarbyl, heteroatom and halogen, and
R$^1$ is hydride or hydrocarbyl,
with the proviso that at least one of X, Y, Z$^1$, Z$^2$ is a heteroatom.

14. The polyolefin according to claim 13, wherein a, b and d are 1, c is 0, and X is C, Y and Z$^1$ are O and R$^1$ is H.

15. The process according to claim 1, wherein the hydrocarbyl group Q according to Formula 1b attached to a main group metal is but-3-en-1-yl, pent-4-en-1-yl, hex-5-en-1-yl, hept-6-en-1-yl or oct-7-en-1yl, 5-ethylenebicyclo[2.2.1]hept-2-ene or 5-propylenebicyclo[2.2.1]hept-2-ene.

16. The process according to claim 15, wherein the metal catalyst or metal catalyst precursor used in step A) comprises Ti, Zr or Hf.

17. The process according to claim 16, wherein
said oxidizing agent used in step B) is selected from the group consisting of O$_2$, O$_3$, N$_2$O, CO$_2$ and SO$_3$;
the additional chain transfer and/or shuttling agent used in step A) is selected from the group consisting of hydrocarbyl aluminum, hydrocarbyl magnesium, hydrocarbyl zinc, hydrocarbyl gallium, hydrocarbyl boron, hydrocarbyl calcium, or a combinations thereof;
the at least one second type of olefin monomer comprising a main group metal hydrocarbyl chain transfer agent is selected from the group consisting of bis(isobutyl)(5-ethylen-yl-2-norbornene) aluminum, di(isobutyl)(7-octen-1-yl) aluminum, di(isobutyl)(5-hexen-1-yl) aluminum, di(isobutyl)(3-buten-1-yl) aluminum, tris(5-ethylen-yl-2-norbornene) aluminum, tris(7-octen-1-yl) aluminum, tris(5-hexen-1-yl) aluminum, or tris(3-buten-1-yl) aluminum, ethyl(5-ethylen-yl-2-norbornene) zinc, ethyl(7-octen-1-yl) zinc, ethyl(5-hexen-1-yl) zinc, ethyl(3-buten-1-yl) zinc, bis(5-ethylen-yl-2-norbornene) zinc, bis(7-octen-1-yl) zinc, bis(5-hexen-1-yl) zinc, and bis(3-buten-1-yl) zinc;
the co-catalyst is selected from the group consisting of MAO, DMAO, MMAO, SMAO fluorinated aryl borane and fluorinated aryl borate; and
the at least one first type of olefin monomer used in step A) is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclopentene, cyclohexene, norbornene, ethylidene-norbornene, vinylidene-norbornene, and a combination thereof.

18. A polyolefin obtained by a process according to claim 15 having one or multiple end-functionalized branches, having a number average molecular weight (M$_n$) between 500 and 1,000,000 g/mol and having a polydispersity index (D) of between 1.1 and 10.0 and wherein said polyolefin has a degree of functionalization of at least 30%,
wherein said polyolefin having one or multiple end-functionalized branches is according to Formula I.I:

Pol-XY$_a$Z$^1_b$Z$^2_c$R$^1_d$  (Formula I.I), wherein
a, b, c and d are each independently 0 or 1,
X, Y, Z$^1$, Z$^2$ are each independently selected from carbon, hydrocarbyl, heteroatom and halogen, and
R$^1$ is hydride or hydrocarbyl,
with the proviso that at least one of X, Y, Z$^1$, Z$^2$ is a heteroatom.

19. The polyolefin according to claim 18, wherein a, b and d are 1, c is 0, and X is C, Y and Z$^1$ are O and R$^1$ is H.

* * * * *